(12) United States Patent  
Murphy et al.

(10) Patent No.: US 9,261,654 B2  
(45) Date of Patent: Feb. 16, 2016

(54) FIBER OPTIC ADAPTER PLATES WITH INTEGRATED FIBER OPTIC ADAPTERS

(75) Inventors: James Murphy, Mill Creek, WA (US); Tom Sauter, Seattle, WA (US); Loren Borg, Everett, WA (US); Michael Everett, Monroe, WA (US)

(73) Assignee: LEVITON MANUFACTURING CO., INC., Melville, NY (US)

(*) Notice: Subject to any disclaimer, the term of this patent is extended or adjusted under 35 U.S.C. 154(b) by 974 days.

(21) Appl. No.: 12/578,216

(22) Filed: Oct. 13, 2009

(65) Prior Publication Data

US 2011/0085774 A1      Apr. 14, 2011

(51) Int. Cl.
| | |
|---|---|
| *G02B 6/38* | (2006.01) |
| *H04Q 1/02* | (2006.01) |
| *G02B 6/44* | (2006.01) |

(52) U.S. Cl.
CPC ............ *G02B 6/3825* (2013.01); *G02B 6/3897* (2013.01); *G02B 6/3895* (2013.01); *G02B 6/4452* (2013.01); *H04Q 1/09* (2013.01)

(58) Field of Classification Search
CPC .. G02B 6/3825; G02B 6/3849; G02B 6/3897; G02B 6/3893; G02B 6/3851; G02B 6/3869; G02B 6/4452; H04Q 2201/10; H04Q 1/09
USPC .......................... 385/63, 135–136, 51, 54, 56
See application file for complete search history.

(56) References Cited

U.S. PATENT DOCUMENTS

| | | | |
|---|---|---|---|
| 4,408,353 A | 10/1983 | Bowen et al. | |
| 5,297,227 A | 3/1994 | Brown et al. | |
| 5,420,951 A | 5/1995 | Marazzi et al. | |
| 5,987,203 A | 11/1999 | Abel et al. | |
| 6,224,269 B1 | 5/2001 | Engstrand et al. | |

(Continued)

FOREIGN PATENT DOCUMENTS

| | | |
|---|---|---|
| EP | 0768547 A1 | 4/1997 |
| EP | 1186921 A2 | 3/2002 |

(Continued)

OTHER PUBLICATIONS

"Plug & Play Systems with Multi-Fiber Connectors: Polarity Explained", AEN 069, Revision 8, Oct. 7, 2007, (c) 2000, 2002 Corning Cable Systems LLC, 7 pages.

(Continued)

*Primary Examiner* — Ryan Lepisto  
*Assistant Examiner* — Erin Chiem  
(74) *Attorney, Agent, or Firm* — Amin, Turocy & Watson, LLP

(57) ABSTRACT

Structures, devices and methods are provided for creating fiber optic adapter plates with integrated fiber optic adapters. In one aspect, fiber optic adapter plates having integrated fiber optic adapter subassemblies are formed from a moldable plastic. For example, a molded plastic fiber optic adapter plate can include a molded plastic adapter back plate having a plurality of integrated fiber optic adapter subassemblies and one or more attachment mechanisms that facilitate locating and attaching an adapter front plate having a corresponding plurality of integrated fiber optic adapter subassemblies on the adapter front plate. Advantages provided by integrating fiber optic adapters into the molded plastic assemblies include superior mechanical strength, manufacturing cost reductions and adapter placement flexibility among other advantages.

25 Claims, 22 Drawing Sheets

(56) References Cited

U.S. PATENT DOCUMENTS

| | | |
|---|---|---|
| 6,351,590 B1 | 2/2002 | Shahid |
| 6,443,627 B1 * | 9/2002 | Anderson et al. ............... 385/56 |
| 6,498,882 B1 | 12/2002 | Buckelew et al. |
| 6,694,083 B2 | 2/2004 | Paradiso et al. |
| 6,715,928 B1 * | 4/2004 | Matasek et al. ................. 385/56 |
| 6,741,783 B2 * | 5/2004 | Shibutani et al. ............. 385/134 |
| 6,758,600 B2 | 7/2004 | Del Grosso et al. |
| 6,869,227 B2 | 3/2005 | Del Grosso et al. |
| 7,147,383 B2 | 12/2006 | Sullivan |
| 7,237,966 B2 | 7/2007 | Quinby et al. |
| 7,416,347 B2 | 8/2008 | Livingston et al. |
| 7,689,079 B2 | 3/2010 | Burnham et al. |
| 7,756,371 B1 | 7/2010 | Burnham et al. |
| 8,485,737 B2 | 7/2013 | Kolesar |
| 2004/0126069 A1 | 7/2004 | Jong et al. |
| 2005/0058402 A1 * | 3/2005 | Ernst et al. ...................... 385/56 |
| 2009/0016684 A1 * | 1/2009 | Beck ............................... 385/78 |
| 2012/0027355 A1 | 2/2012 | LeBlanc et al. |
| 2014/0270636 A1 | 9/2014 | Manes |

FOREIGN PATENT DOCUMENTS

| | | |
|---|---|---|
| EP | 1341015 A1 | 9/2003 |
| TW | 200712584 | 4/2007 |
| TW | 200839335 | 10/2008 |

OTHER PUBLICATIONS

"TIA Releases Guidelines for Maintaining Polarity Using Array Connectors", TIA Polarity Standard, Corning Cable Systems LLC, 6 pages.

European Search Report dated Jan. 13, 2011 for European Application No. 10187404.8-1234, 6 pages.

Office Action dated Jul. 30, 2014 for U.S. Appl. No. 13/326,913, 14 pages.

Office Action dated Mar. 24, 2015 for U.S. Appl. No. 13/326,913, 20 pages.

Office Action dated Jan. 15, 2014 for U.S. Appl. No. 13/326,913, 25 pages.

* cited by examiner

FIBER OPTIC ADAPTER PLATES WITH INTEGRATED FIBER OPTIC ADAPTERS

FIELD OF THE INVENTION

The subject disclosure is directed to fiber optic adapter plates and, more specifically, relates to fiber optic adapter plates with integrated fiber optic adapters.

BACKGROUND OF THE INVENTION

Optical fiber has been used as a medium for telecommunication and networking because it is flexible and can be bundled as cables. Optical fiber has been especially advantageous for long-distance communications because light propagates through the fiber with little attenuation compared to electrical signals carried by conventional wire cables. Over short distances, such as networking within a building, optical fiber interconnect cables save space in cable ducts because a single fiber can carry more data than a single electrical cable.

Interconnect cables are primarily used as intra-equipment jumpers or patch cords. For example, some typical applications include patching active electronics to nearby patch panels, cable cross-connection on distribution frames, and connecting work area outlets to terminal equipment. Fiber optic patch cords comprise a length of cable with a plug or connector on one, or both ends, and can also be referred to as connectorized fiber optic cables. A patch panel typically comprises a connecting hardware system (e.g., racks, adapter plates, arrays of adapters, etc.) that facilitates cable termination and cabling administration via the use and administration of standard-conforming adapters.

Various fiber optic cable connector and adapter designs can be used to meet the requirements of corresponding Fiber Optic Connector Intermateability Standard (FOCIS) documents. Note that the term adapter, when used in reference with optical fiber, has been defined by the optical fiber industry and standards organizations as a mechanical termination device designed to align and join two like optical connectors.

In some designs, fiber optic adapter plates provide the means to support and align the interconnection of connectorized fiber optic cables in structured voice or data cabling networks. Conventionally, fiber optic adapter plates use a metal or plastic plate or support panel having a series of cutouts to accept discrete fiber optic adapters which are typically attached to the adapter plate by screws or clips. In turn, these adapter plates have a removable attaching mechanism (e.g., screws, clips, latches, etc.) to attach the adapter plate to an enclosure or patch panel.

However, such conventional adapter plates suffer from drawbacks due to the assembly of so many discrete parts. For example, alignment of the connecting optical fibers is crucial to minimize loss across the adapter. While internal fiber optical interface details (e.g., cable separation, alignment, etc.) are specified by rigid standards, the adapter to adapter plate connection is more flexible. As a result, excessive tolerances can result in additional mechanical play between the adapter and adapter plate which can, in some instances, allow for excessive stresses and bend radii of the connecting fiber optic cables.

As a further example, such conventional assemblies by their nature require costly assembly steps. As a cost saving measure, some of the assembly steps can be passed on to the end user. However, this can lead to increased set up time, having costs of its own, and can result in end user frustration. In addition, conventional adapter plate panels are often unlabeled or stamped with labels that are difficult for the end user to ascertain, particularly when the adapter plate is fully outfitted with adapters and cabling.

It is thus desired to provide fiber optic adapter plates that improve upon these and other deficiencies of conventional fiber optic adapter plates.

SUMMARY OF THE INVENTION

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In various embodiments, the disclosed subject matter provides fiber optic adapter plates that include integrated fiber optic adapters. In an aspect, the fiber optic adapter plates can be comprised of a rigid or semi-rigid material, such as a moldable plastic or polymer that incorporates fiber optic adapter subassemblies. For example, a molded plastic fiber optic adapter plate can include a molded plastic adapter back plate having a plurality of integrated fiber optic adapter subassemblies and one or more attachment mechanisms that facilitate locating and attaching an adapter front plate having a corresponding plurality of integrated fiber optic adapter subassemblies on the adapter front plate. In a further aspect, the moldable plastic or polymer can be selected based on a color scheme according to an intended use of the fiber optic adapter plate (e.g., a standardized color scheme).

In other embodiments, labels can be molded into the fiber optic adapter plates. In yet another aspect, embodiments of the disclosed fiber optic adapter plates can incorporate attachment mechanisms suitable for attaching the adapter plates to a fiber optic enclosure, patch panel, fiber optic rack, etc. Further embodiments of the disclosed subject matter provide methodologies for producing plastic fiber optic adapter plates. In addition, various other modifications, alternative embodiments, advantages of the disclosed subject matter, and improvements over conventional fiber optic adapter plates using discrete adapters are described.

These and other additional features of the disclosed subject matter are described in more detail below.

BRIEF DESCRIPTION OF THE DRAWINGS

The devices, components, assemblies, structures, and methodologies of the disclosed subject matter are further described with reference to the accompanying drawings in which.

DETAILED DESCRIPTION OF ILLUSTRATIVE EMBODIMENTS

Overview

Figure 1:
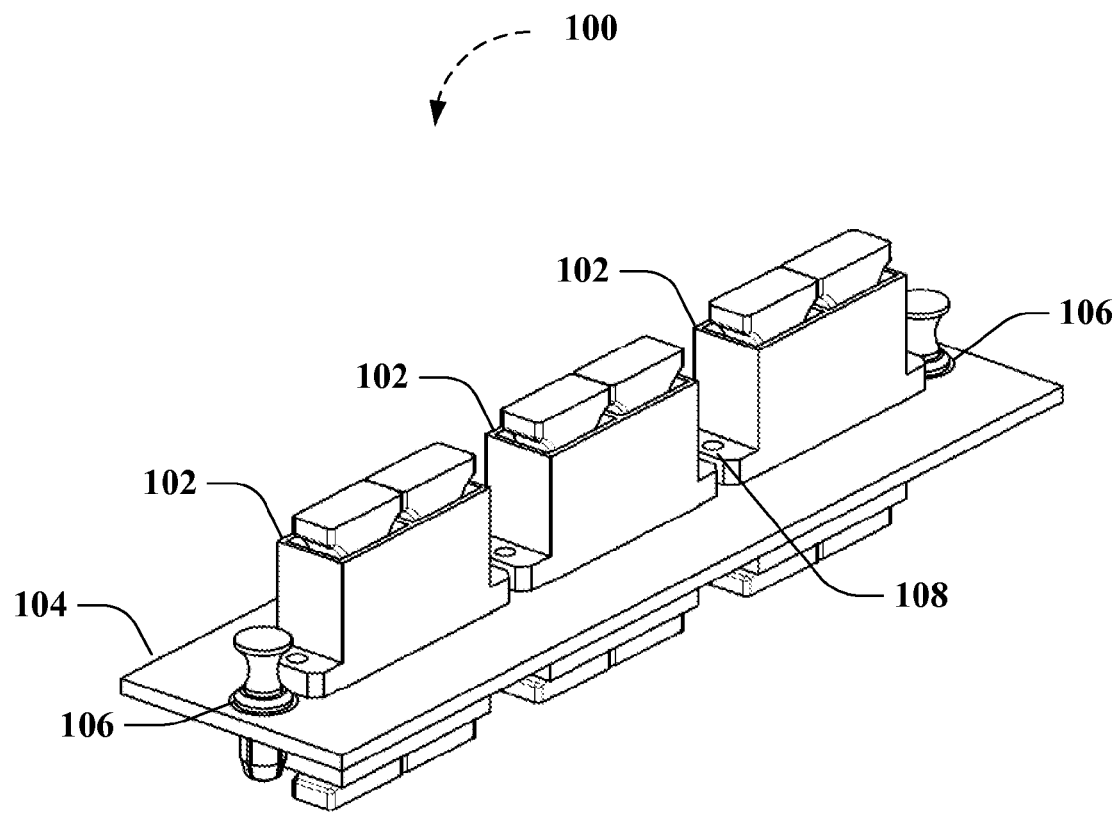
FIG. 1 depicts a diagram of an exemplary prior art Standard Connector (SC) fiber optic adapter plate assembly, in which an adapter plate is illustrated with a series of fiber optic adapters attached to a rigid adapter panel.

As used herein, abbreviations are used to denote the following: American National Standards Institute (ANSI); Electronic Industries Alliance (EIA); Fiber Optic Connector Intermateability Standard (FOCIS); Insulated Cable Engineers Association (ICEA); Telecommunications Industry Association (TIA); Standard Connector (SC), also known as Subscriber, Siemens, Snap-in, or Square Connector; Lucent Connector (LC), also known as Little Connector; Physical Contact (PC); Angle-polished Physical Contact (APC); Super-polished Contact (SC); and Ultra-polished Physical Contact (UPC). In addition, as used herein, the terms integrated and integrating are intended to refer to the act of incorporating, forming, or uniting otherwise separate component parts into a whole.

As described herein, various references are made to standards when describing fiber optic connectors and adapters. Such references are made for the purposes of illustration and not limitation. For instance, fiber optic patch cords are fabricated, tested, labeled and packaged in accordance with the applicable ICEA specifications, as adopted for industry use by one or more of ANSI, TIA, and EIA. As a non-limiting example, ICEA S-83-596-2001 (ANSI/TIA/EIA 472C000-B) sets forth a Standard for Optical Fiber Premises Distribution Cable, and ANSI/TIA/EIA-598-A-1995 provides an Optical Fiber Cable Color Coding.

As further examples, the Fiber Optic Connector Intermateability Standards, or FOCIS, are standards written for manufacturers to follow to ensure their connector will be intermateable with other manufacturers' connectors of the same type, by defining minimum physical attributes of mating connector components. Note that fully dimensioned components are not within the scope or intent of FOCIS (e.g., adapter 102 to adapter panel 104 tolerances), but the requirements of FOCIS have been selected with the objectives of ensuring that any combination of plugs or connectors and adapters conforming to the requirements of FOCIS will mechanically intermate and that intermated connector assemblies will meet the standard common level of performance.

For instance, TIA-604-XX standards are created by a TIA Subcommittee on Fiber Optic Interconnecting Devices. As non-limiting examples referred to herein, FOCIS 3 (ANSI/TIA/EIA-604-3) provides the Fiber Optic Connector Intermateability Standard for SC and SC/APC connectors and FOCIS 10 (ANSI/TIA/EIA-604-10) provides the Fiber Optic Connector Intermateability Standard for Lucent (LC) and LC/APC connectors. The FOCIS common level of performance of an intermated connector assembly is the least demanding set of performance requirements in the separate performance specifications of each of the products in the assembly. Thus, it can be appreciated that manufacturer to manufacturer variations in adapter and adapter plate dimensions can lead to excessive tolerances that can, in turn, result in additional mechanical play between the adapter and adapter plate. Among other side effects, such tolerances can result in undesirable insertion loss and excessive bend radii and stresses in the connecting fiber optic cables.

While a brief overview is provided, SC and LC connectors and adapters are described herein for the purposes of illustration and not limitation. The SC standard details a snap-in connector with a 2.5 millimeter (mm) ferrule that is widely used for its excellent performance. The SC is square shape design, with push-pull latching mechanism and a keyed molded housing. The snap-in connector latches with a simple push-pull motion, and is available in a duplex configuration. In addition, two simplex SC connectors can be clipped together by a reusable duplex holding clip to create a duplex SC connector. SC fiber products are available in both single mode and multimode versions.

As another type, the LC standard details a small form factor connector that uses a 1.25 mm ferrule which is half the size of the SC. Otherwise, the LC connector is a standard ceramic ferrule connector incorporating a push-and-latch design that provides pull-proof stability in system rack mounts. The LC connector has good performance, is highly favored for single mode usage and is easily terminated with any adhesive.

As described in the background, however, conventional adapter plates suffer from drawbacks associated with assemblies having many discrete parts, as can be seen in FIGS. 1-4, which provide additional context surrounding the embodiments of the disclosed subject matter. For example, FIG. 1 depicts a diagram of an exemplary SC fiber optic adapter plate assembly 100, in which the adapter plate assembly 100 is illustrated with a series of fiber optic adapters 102 attached to a rigid adapter panel 104. Adapter panels 104 can be fabricated of metal or plastic and can include a series of cutouts that accept discrete fiber optic adapters 102. In addition, adapter panels 104 typically include removable attaching mechanisms 106 (e.g., screws, clips, latches, etc.) for attaching the adapter panels 104 to an enclosure, patch panel, fiber optic rack, etc. (not shown). A patch panel (not shown) typically comprises a connecting hardware system (e.g., racks, adapter plates, arrays of adapters, etc.) that facilitates cable termination and cabling administration via the use of standard-conforming adapters. As used herein, the terms "enclosure," "fiber optic enclosure," and "fiber optic rack" include a structure that can accept a fiber optic adapter plate assembly by providing suitable attachment points.

Figure 2:
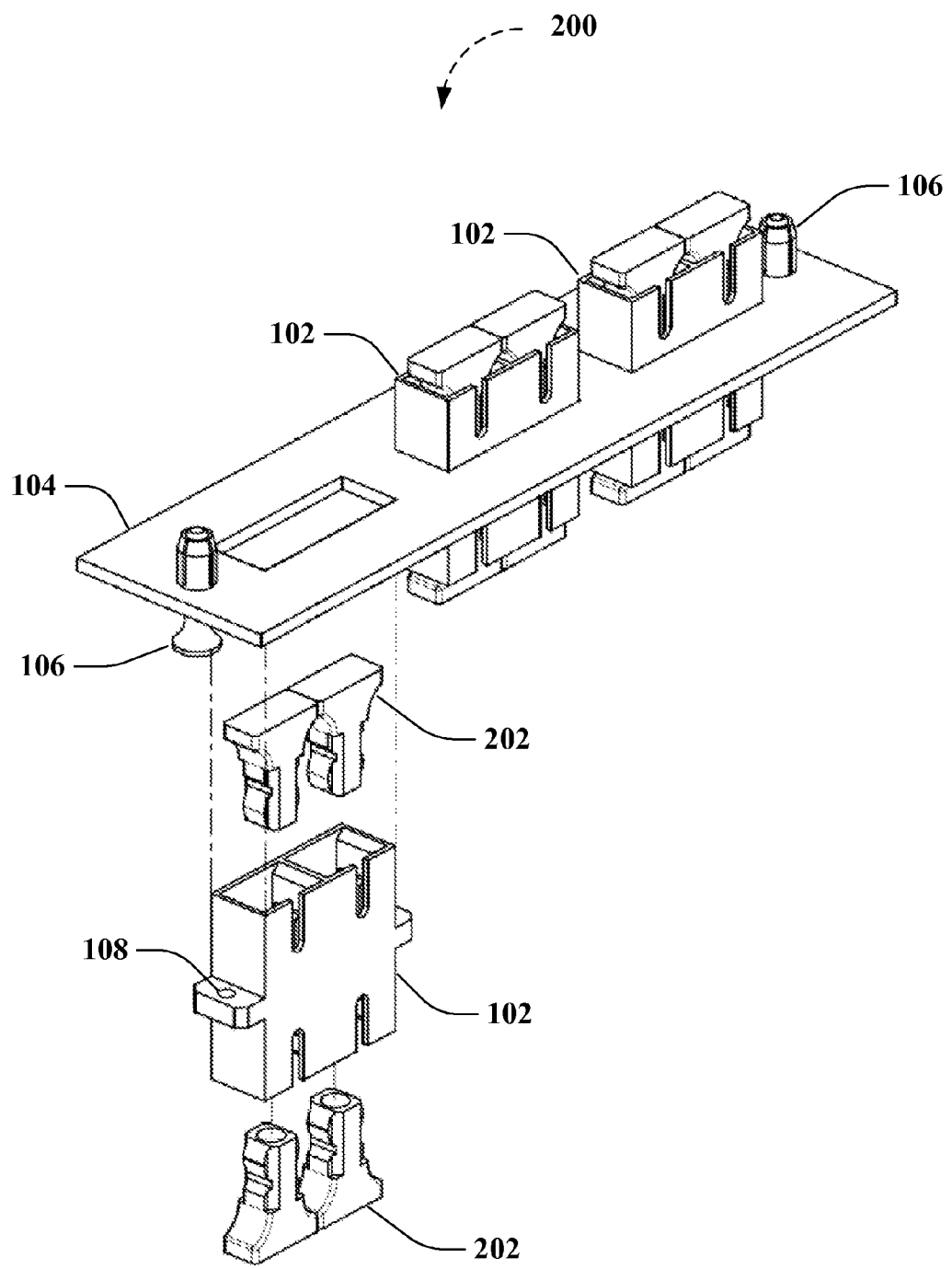
FIG. 2 is an exploded view of a prior art fiber optic adapter plate assembly.

Such fiber optic adapter panels 104 with discrete adapters 102 provide the means to support and align the interconnection of connectorized fiber optic cables (not shown) in structured voice or data cabling networks. The discrete fiber optic adapters 102 typically include mechanisms 108 (e.g., screws, clips, latches, etc.) for attachment of the discrete fiber optic adapters 102 to the adapter panel 104. In FIG. 1, such attachment mechanisms 108 are depicted as holes that can accept a screw or latch mechanism (not shown). FIG. 2 is an exploded view of a fiber optic adapter plate assembly 200 which illustrates further aspects of the connection and configuration of adapter 102 to rigid adapter panel 104. Note that in FIG. 2, one of the adapters 102 is shown with dust caps 202 removed.

Figure 3:
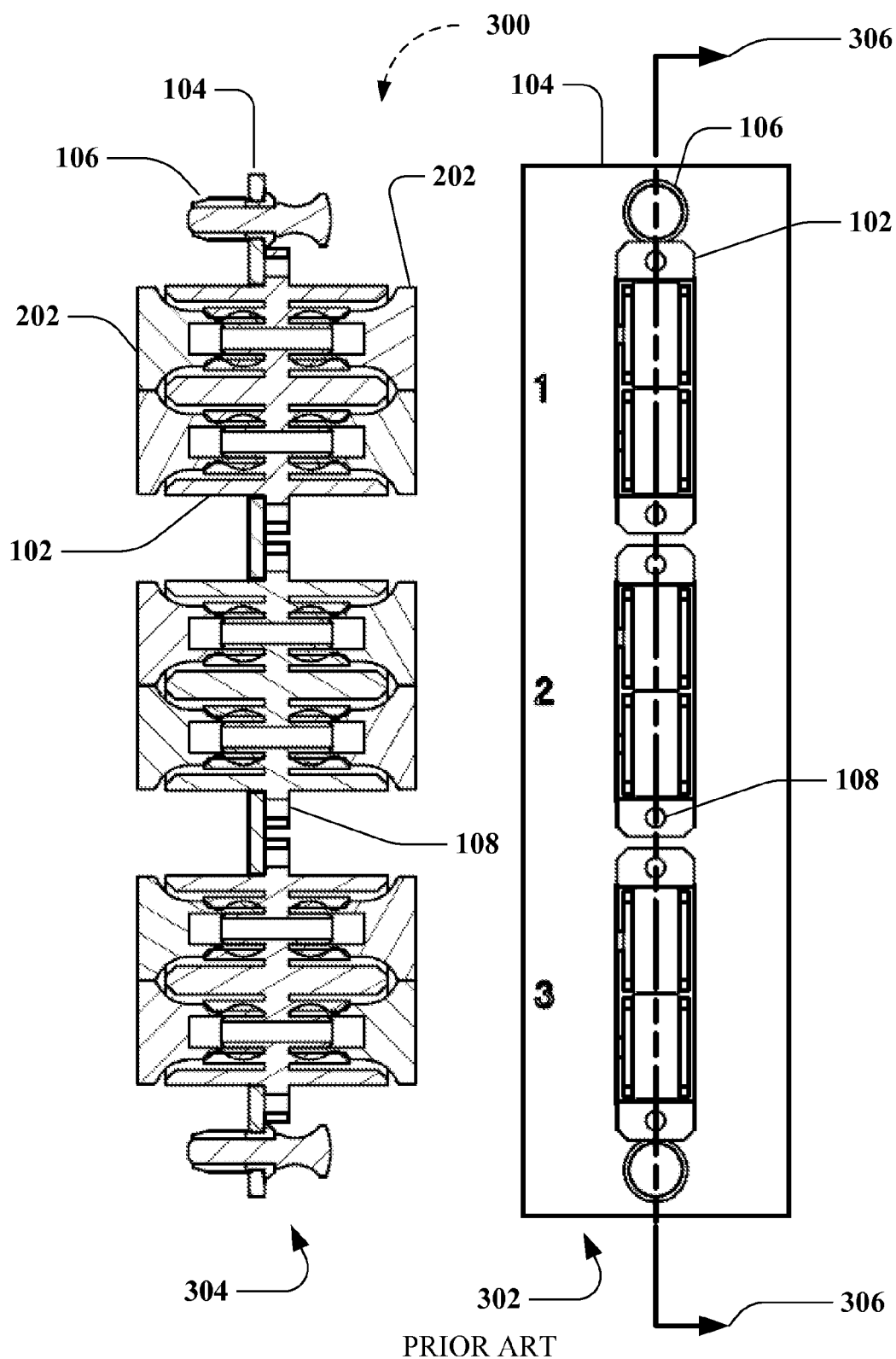
FIG. 3 depicts a top plan view and cross-sectional view taken along section lines 306-306 of FIG. 3 for a prior art fiber optic adapter plate assembly, attached adapters and dust caps.

FIG. 3 depicts a top plan view 302 and cross-sectional view 304 of a fiber optic adapter plate assembly 300, taken along section lines 306-306 of FIG. 3, along with adapters 102 and dust caps 202. Attaching mechanisms 106 are depicted using a push-pin latch 106 mechanism. Mechanisms 108 (e.g., screws, clips, latches, etc.) for attachment of the discrete fiber optic adapters 102 to the adapter panel 104 are also depicted, but, for clarity are not shown with the complementary structure of adapter panel 104 accepting mechanisms 108.

Figure 4:
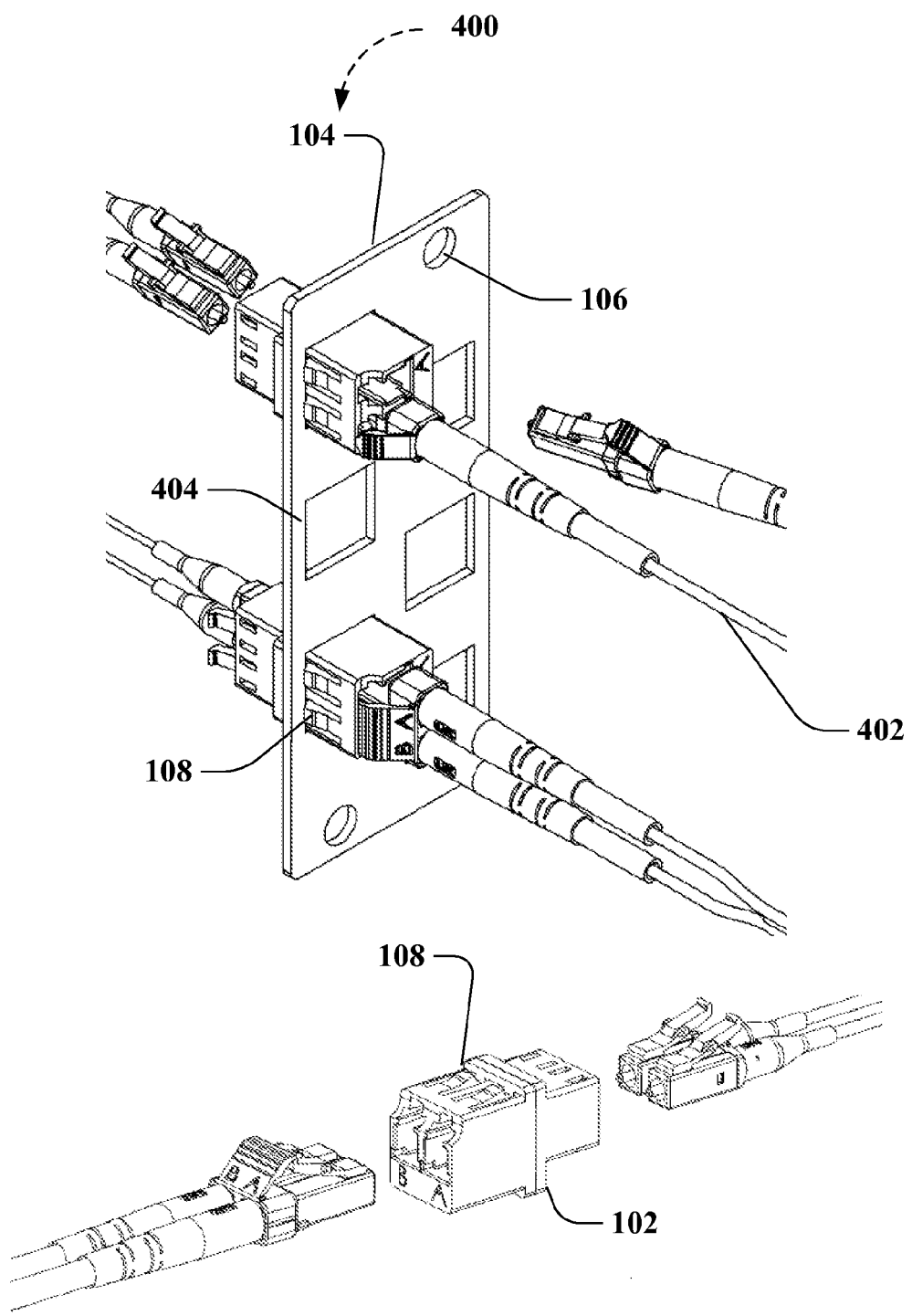
FIG. 4 illustrates an exemplary prior art Lucent Connector (LC) fiber optic adapter plate, in which the adapter to adapter panel and fiber optic cable attachment details are further illustrated.

FIG. 4 illustrates an exemplary LC fiber optic adapter plate assembly 400 in which details of the attachment of adapter 102 to adapter panel 104 and fiber optic cable 402 are further illustrated. As can be seen in FIG. 4, mechanisms 108 (e.g., screws, clips, latches, etc.) for attachment of the discrete fiber optic adapters 102 to the adapter panel 104 are depicted as clips 108 that engage the sides of the holes 404 in the adapter panel 104 to provide a retention mechanism for the discrete fiber optic adapters 102.

Having provided an overview of two types of adapter plate assemblies in various embodiments, the disclosed subject matter provides fiber optic adapter plates that include a plurality of integrated fiber optic cabling adapters which can support the semi-permanent termination and alignment of connectorized fiber optic cables to comprise a structured voice and data cabling network. The disclosed embodiments improve upon conventional adapter plate assemblies by eliminating the use of discrete SC or LC fiber optic adapters and incorporating or integrating these features into one or more separate parts comprised of a rigid or semi-rigid material such as a moldable plastic or polymer.

In non-limiting embodiments of the disclosed subject matter, separate moldable plastic or polymer parts can be permanently joined or affixed into an assembly by factory personnel or machines to provide fiber optic adapter plates with integrated fiber optic adapters. As an example, a molded plastic fiber optic adapter plate can include a molded plastic adapter back plate having a plurality of integrated fiber optic adapter subassemblies and one or more attachment mechanisms that facilitate locating and attaching an adapter front plate having a corresponding plurality of integrated fiber optic adapter subassemblies on the adapter front plate.

Advantageously, the disclosed embodiments provide dramatically superior mechanical strength, eliminate substantially all movement of the fiber optic adapter within the parent fiber optic adapter plate, significantly reduce manufacturing build cost and significantly increase the visibility of port marking(s) for easier identification of port markings on the termination side of the fiber optic adapter plate to aid installers and end users in correctly maintaining the network. The elimination of substantially all movement of the fiber optic adapter 102 within the parent fiber optic adapter panel 104 provides functional benefits with regard to the support, alignment and longevity of attached fiber optic cabling. In addition to such tangible benefits, a tighter connection of adapter 102 to adapter panel 104 can lead to an industry perception of enhanced product quality as well.

As a further advantage, embodiments of the disclosed subject matter enable unique options for selection of adapter 102 location within the adapter plates 104. For example, with two larger pieces being combined into an assembly, adapter plate designers are afforded the ability to vary connector location (e.g., offset to one side, staggered, etc.) to maximize the ability to grasp and manipulate attached cabling in rows of connectors without being constrained by an edge margin that would otherwise be required for a conventional adapter plate hole and connector (e.g., required edge margin for a snap-fit connector in a conventional adapter plate). For similar reasons, higher adapter density can be achieved according to aspects disclosed herein.

While SC and LC connectors and adapters are described herein for the purposes of illustration and not limitation, variations of the disclosed embodiments as suggested by the disclosed structures and methodologies are intended to be encompassed within the scope of the subject matter disclosed herein. For example, the various embodiments of the structures, devices and methodologies of the disclosed subject matter can include additional standardized (e.g., as described in a FOCIS document) or as yet undeveloped fiber optic connector and adapter types or standards. In addition, variations encompassed within the scope of the disclosed subject matter can include separation or further integration of some components parts, variation in the location, number and/or arrangement of integrated adapter subassemblies.

As a further example of illustrative but not limiting purposes, single mode fiber optic connectors and multimode fiber optic connectors can have PC or UPC characteristics, while single mode fiber optic connectors can additionally have APC characteristics, each of which refer to the extent to which the fiber and ferrule end of the fiber optic connectors are polished. Insertion loss is the loss of signal power resulting from the insertion of a device in a transmission line or optical fiber, and it is noted that insertion loss of the fiber optic connector should be minimized. It is known that APC insertion loss is smaller than UPC which is smaller than PC.

To ensure successful installations, connectors with a plastic shell (e.g., SC connectors) typically use a color-coded shell and cable jackets and boots use standard color codes, for identification of intended use of connectors and cables. As such, a further aspect of the disclosed subject matter provides color coded (e.g., yellow, orange, aqua, grey, blue, clear, etc.) front adapter plates, back adapter plates, none or both as desired or dictated by convention or standard. For example, in one non-limiting embodiment, a standard color coded front adapter plate having labeling molded into the plate can be attached to a contrasting color back adapter plate to provide a high contrast and high visibility labeled adapter plate assembly.

Figure 5:
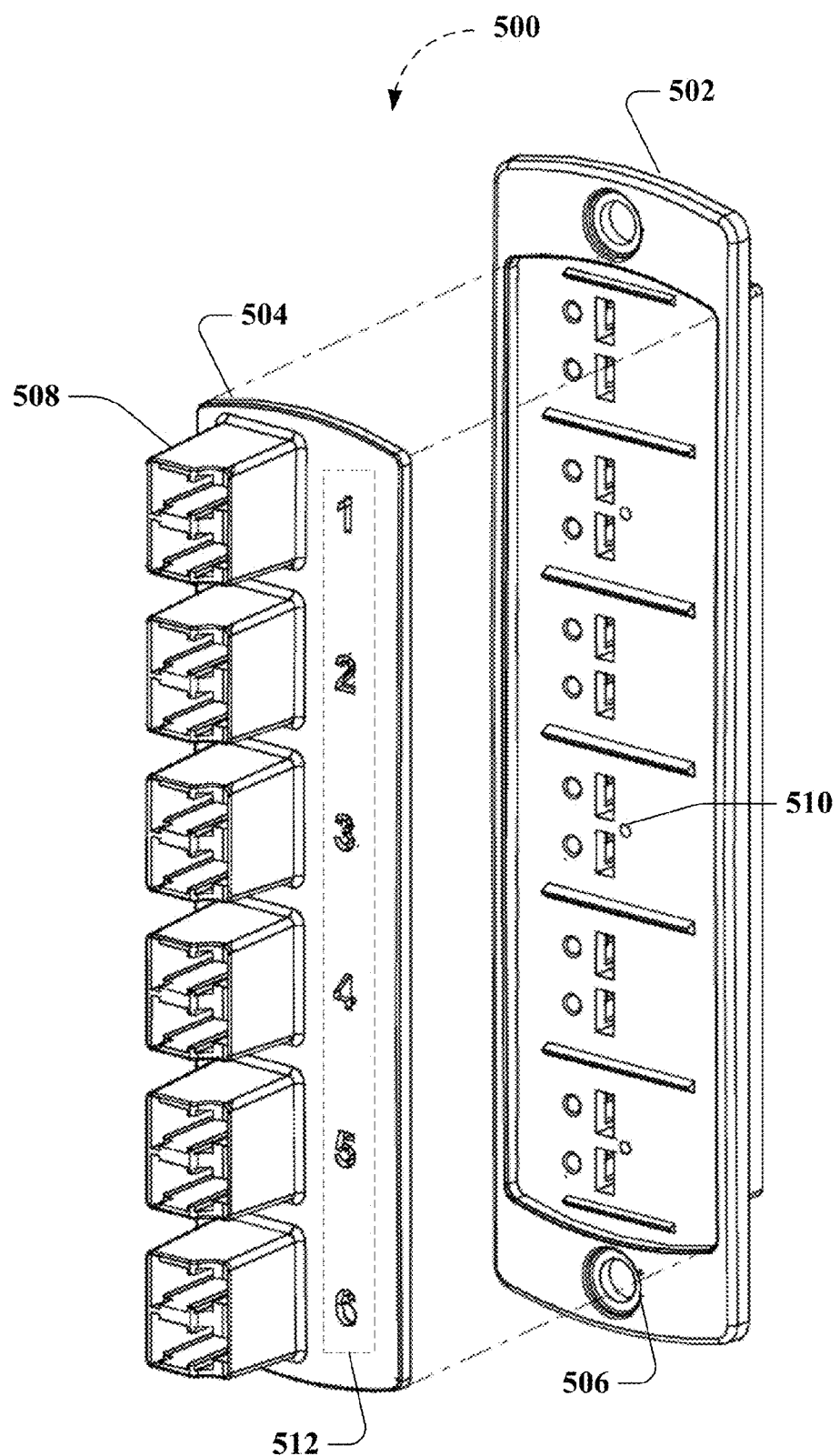
FIG. 5 depicts exemplary non-limiting embodiments of an integrated LC fiber optic adapter plate assembly back adapter plate and front adapter plate in an exploded view according to various aspects of the disclosed subject matter.

Exemplary Non-Limiting Fiber Optic Adapter Plates with Integrated Fiber Optic Adapters FIG. 5 depicts exemplary non-limiting embodiments of an integrated LC fiber optic adapter plate assembly 500 back adapter plate 502 and front adapter plate 504 in exploded view according to various aspects of the disclosed subject matter. Using terminology similar to that of FIGS. 1-4, while highlighting features of the various embodiments set forth herein, adapter plate assembly 500 back adapter plate 502 and front adapter plate 504 can be fabricated (e.g., injection molded) of a rigid or semi-rigid material such as plastic (e.g., of a moldable plastic, polymer, etc.). Adapter plate assembly 500 back adapter plate 502 can include removable attaching mechanisms 506 (e.g., screws, clips, latches, etc.) or holes suitable for use in attaching the adapter plate assembly 500 to an enclosure or patch panel (not shown). As with adapter plate assemblies 100, a patch panel (not shown) typically comprises a connecting hardware system (e.g., racks, adapter plates, arrays of adapters, etc.) that facilitates cable termination and cabling administration via the use of standard-conforming adapters.

For purposes of illustration, the LC fiber optic adapter plate assembly 500 is depicted as a 6-way duplex LC fiber optic adapter plate assembly. It can be appreciated that other embodiments are possible (e.g., n-way simplex, n-way duplex, n-way with other adapters that are either specified by FOCIS or yet to be developed or standardized, where n is an integer, or any combination, and so on). As such, the disclosed subject matter should not be limited by any particular embodiment disclosed herein, and should be afforded the breadth and scope as can be appreciated by one of ordinary skill in the optical fiber art.

Figure 6:
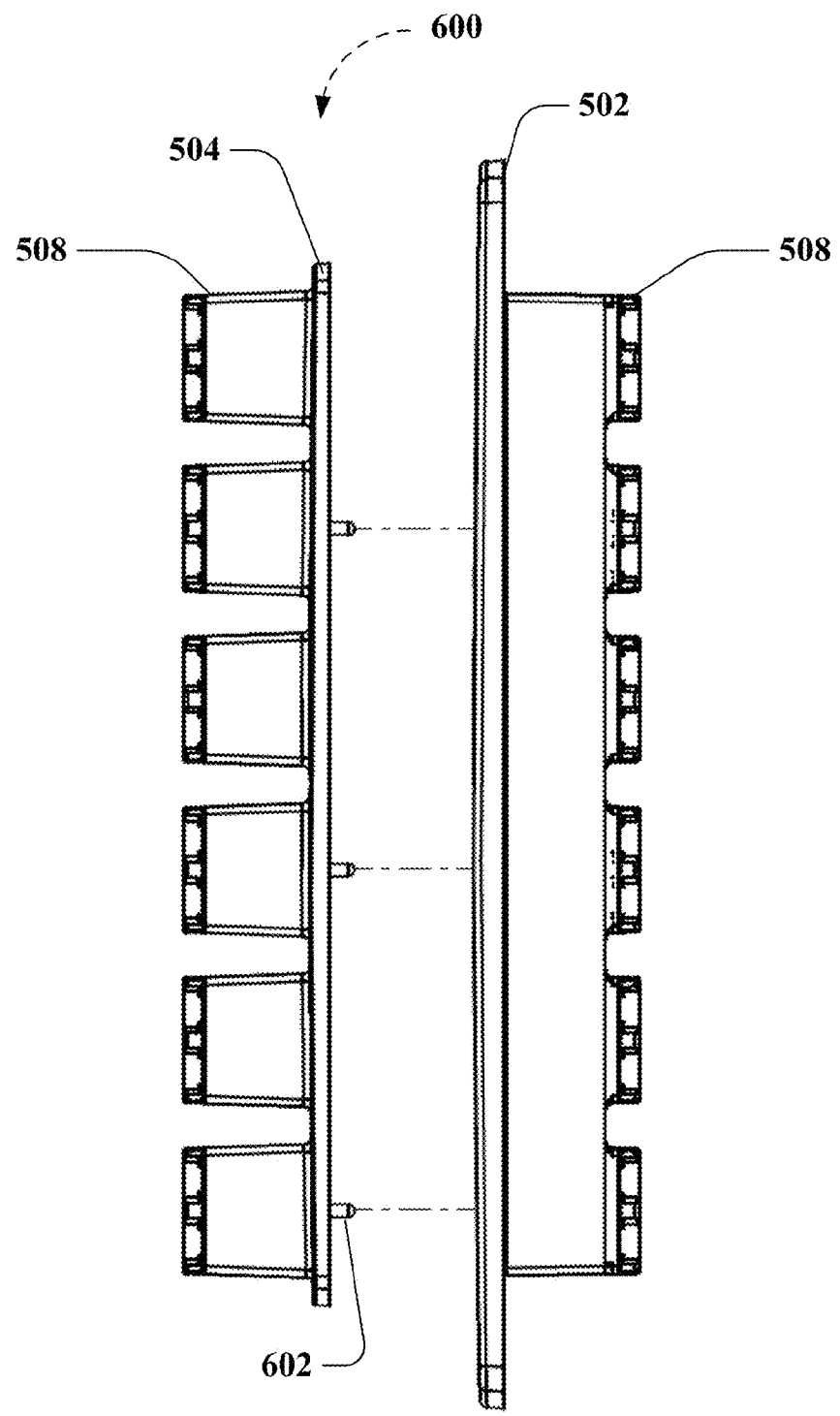
FIG. 6 is a side plan view of exemplary non-limiting embodiments of an integrated LC fiber optic adapter plate assembly back adapter plate and front adapter plate according to further aspects of the disclosed subject matter.

In addition, FIG. 5 depicts front adapter plate 504 comprising a plurality of integrated fiber optic cabling adapter subassemblies 508, which in this non-limiting embodiment, are depicted as integrated LC fiber optic cabling adapter subassemblies 508. Note that fiber optic cabling adapter subassembly 508 is depicted as portions of an adapter housing (e.g., LC fiber optic cabling adapter housing) integrated with front adapter plate 504, which can be combined with a complementary portion such as a fiber optic cabling adapter subassembly 508 that is integrated into back adapter plate 502, as shown in FIG. 6.

For ease of explanation and not limitation, these integrated fiber optic cabling adapter subassemblies 508 are described together using common reference characters. However, it can be appreciated that adapter subassemblies 508 for back adapter plate 502 and front adapter plate 504 can have different physical dimensions and other characteristics depending on the design of the chosen adapter type and other factors. In other words, the use of the terminology "adapter subassemblies" is intended to convey that the two complementary adapter subassemblies 508 on a back adapter plate 502 and front adapter plate 504, when combined in conjunction with other standard fiber optic cabling interface components, can create a functional standard fiber optic adapter that is integrated into the adapter plate assembly 500 comprised of back adapter plate 502 and front adapter plate 504.

Note further that back adapter plate 502 and front adapter plate 504 can further include structures (e.g., hole or recess 510 of back adapter plate 502, mating pins or studs not shown in FIG. 5 of front adapter plate 504, etc.) that facilitate assembly of plates 502 and 504 by factory personnel or machines to provide fiber optic adapter plate assemblies 500 with integrated fiber optic adapters. It can be appreciated that such mating pins or studs and associated holes or recesses 510, in conjunction with a recessed face of the back adapter plate 502 and mating surface on the front adapter plate 504, can aid in aligning the corresponding adapter subassemblies 508.

FIG. 5 illustrates a further aspect of the disclosed subject matter in that front adapter plate 504 can further include molded port markings 512 (e.g., such as a relief cut molded into the surface or through molded such that the back adapter plate 502 details such as contrasting colors can be apparent from the front through the labeling) as part of the front adapter plate 504 fabrication process. Such molded port markings can provide a high contrast marking to facilitate easy identification of port markings on the termination side of the fiber optic adapter plate assembly 500 to aid installers and end users in correctly maintaining the network.

FIG. 6 depicts a side plan view of exemplary non-limiting embodiments of an integrated LC fiber optic adapter plate assembly 600 back adapter plate 502 and front adapter plate 504 according to further aspects of the disclosed subject matter. In conjunction with the integrated LC fiber optic adapter plate assembly 500 of FIG. 5, adapter plate assembly 600 further details an attachment mechanism for attaching back adapter plate 502 and front adapter plate 504 to form fiber optic adapter plate assembly 600. For example, note that front adapter plate 504 can further include structures (e.g., mating pins or studs 602 of front adapter plate 504, etc.) that mate with hole or recess 510 of back adapter plate 502 to facilitate assembly of plates 502 and 504 by factory personnel or machines to provide fiber optic adapter plate assemblies with integrated fiber optic adapters.

Figure 7:
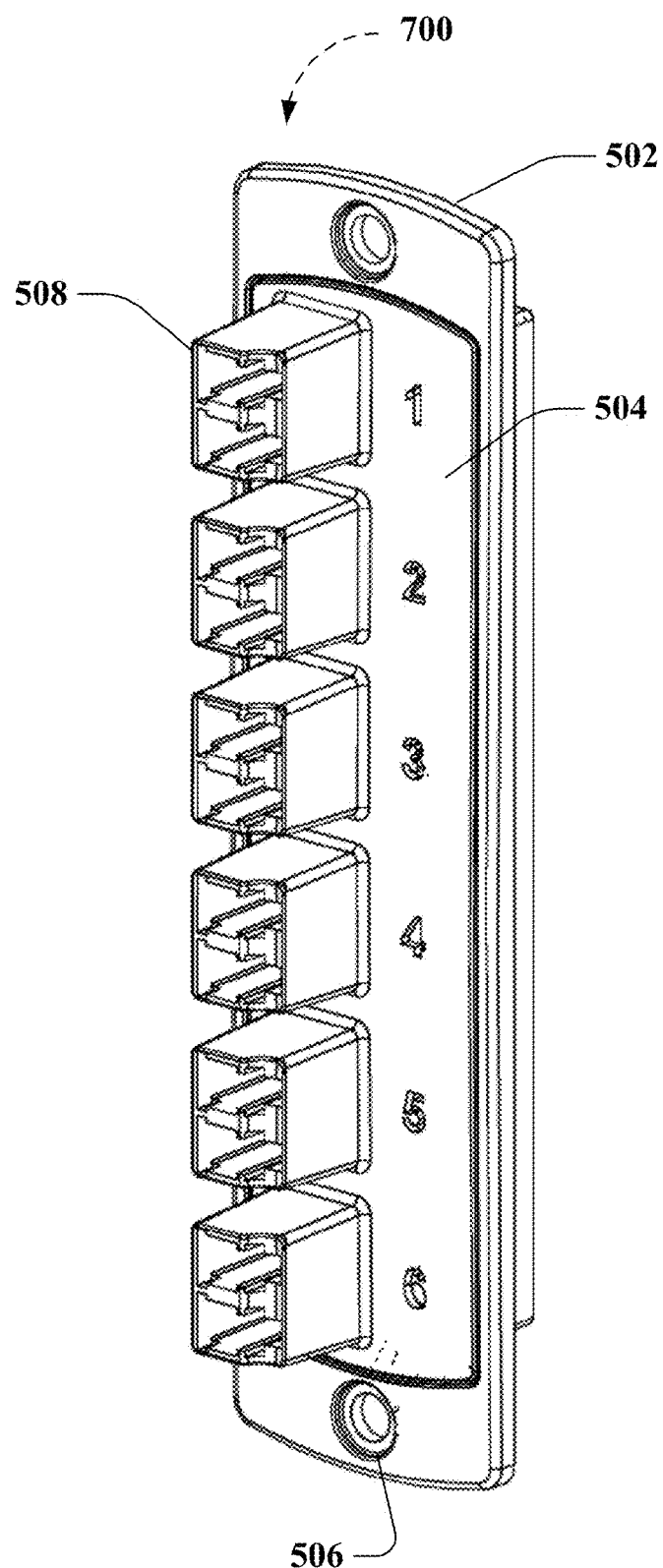
FIG. 7 depicts an exemplary embodiment of an integrated LC fiber optic adapter plate assembly.

Further note that FIG. 6 depicts back adapter plate 502 comprising a plurality of integrated fiber optic cabling adapter subassemblies 508, which in this non-limiting embodiment are depicted as integrated LC fiber optic cabling adapter subassemblies 508. FIG. 7 depicts an exemplary embodiment of an integrated LC fiber optic adapter plate assembly 700. When back adapter plate 502 is joined or affixed to front adapter plate 504 by factory personnel or machines, an integrated fiber optic adapter plate assembly (e.g., 500, 600, 700, etc.) can be produced with various associated advantages as described herein.

A variety of methods can be used to join or affix back adapter plate 502 to front adapter plate 504. For example, back adapter plate 502 can be joined or affixed to front adapter plate 504 via plastic welding (e.g., Radio Frequency (RF) welding, ultrasonic welding, High Frequency (HF) welding, extrusion welding, contact welding, hot plate welding, solvent welding, etc.), a snap fit (e.g., such as where mating pins or studs 602 of front adapter plate 504 mate and snap into a hole or recess 510 of back adapter plate 502), thermoplastic staking or heat staking (e.g., such as where mating pins or studs 602 of front adapter plate 504 mate with hole or recess 510 of back adapter plate 502 and heat is applied to melt the mated surfaces together), application and curing of adhesives to the complementary mating surfaces of back adapter plate 502 and front adapter plate 504 (e.g., adhesive bonding), mechanical connections (e.g., screws, latches, rivets, etc.), and so on.

Figure 8:
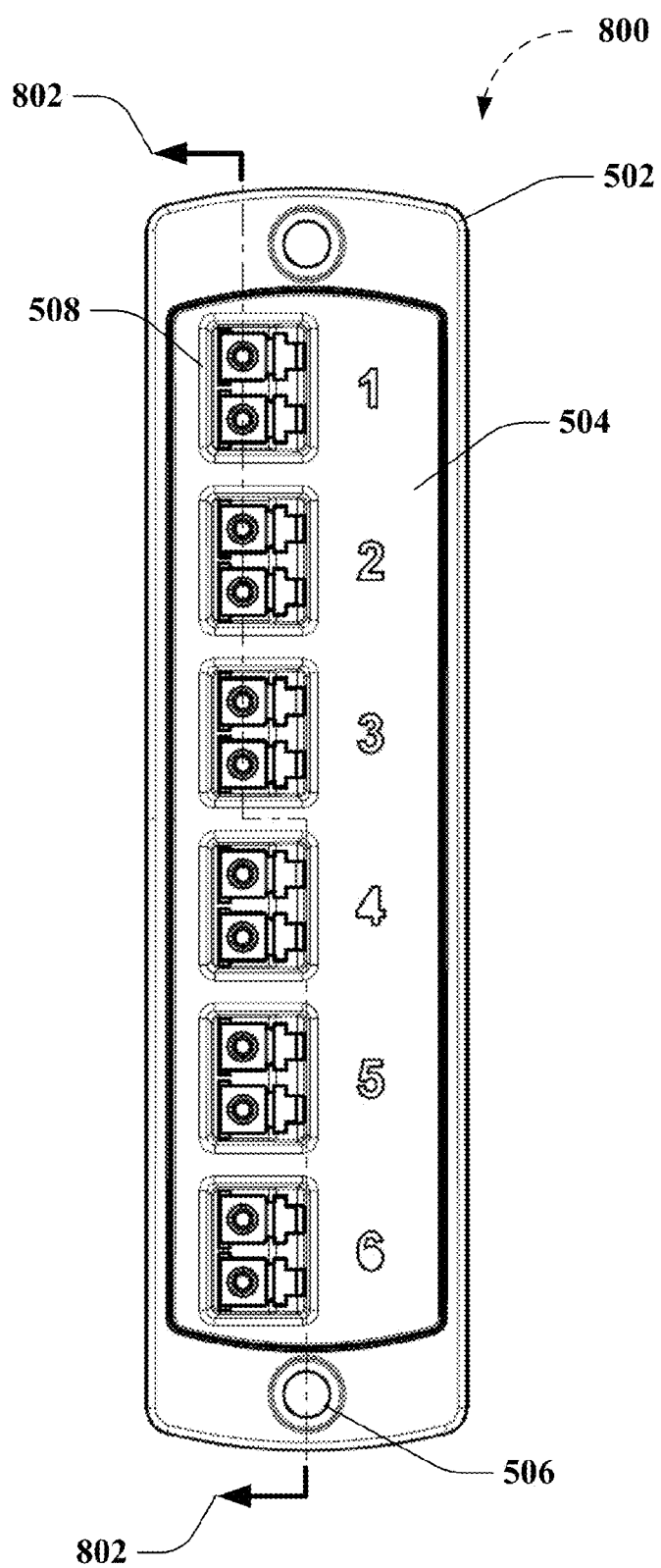
FIG. 8 depicts a front elevation view of an exemplary integrated LC fiber optic adapter plate assembly according to aspects of the disclosed subject matter in which section lines indicate sectional details further detailed in FIG. 9.

Note that, for the purposes of illustration and not limitation, assemblies 500, 600, and 700 are described as comprising back adapter plate 502 and front adapter plate 504. However, it should be appreciated that, in some instances, additional component pieces (e.g., TIA standard fiber optic interface pieces, etc. (not shown)) can be required to join or affix back adapter plate 502 and front adapter plate 504 to form a complete and functioning integrated fiber optic adapter plate assembly (e.g., 500, 600, 700, etc.) as described below (e.g., ferrules or sleeves, fiber optic cable interface component pieces such as latches, etc.). FIG. 8 depicts a front elevation view of an exemplary integrated LC fiber optic adapter plate assembly 800 according to aspects of the disclosed subject matter, in which section lines 802-802 indicate sectional details further detailed in FIG. 9.

Figure 9:
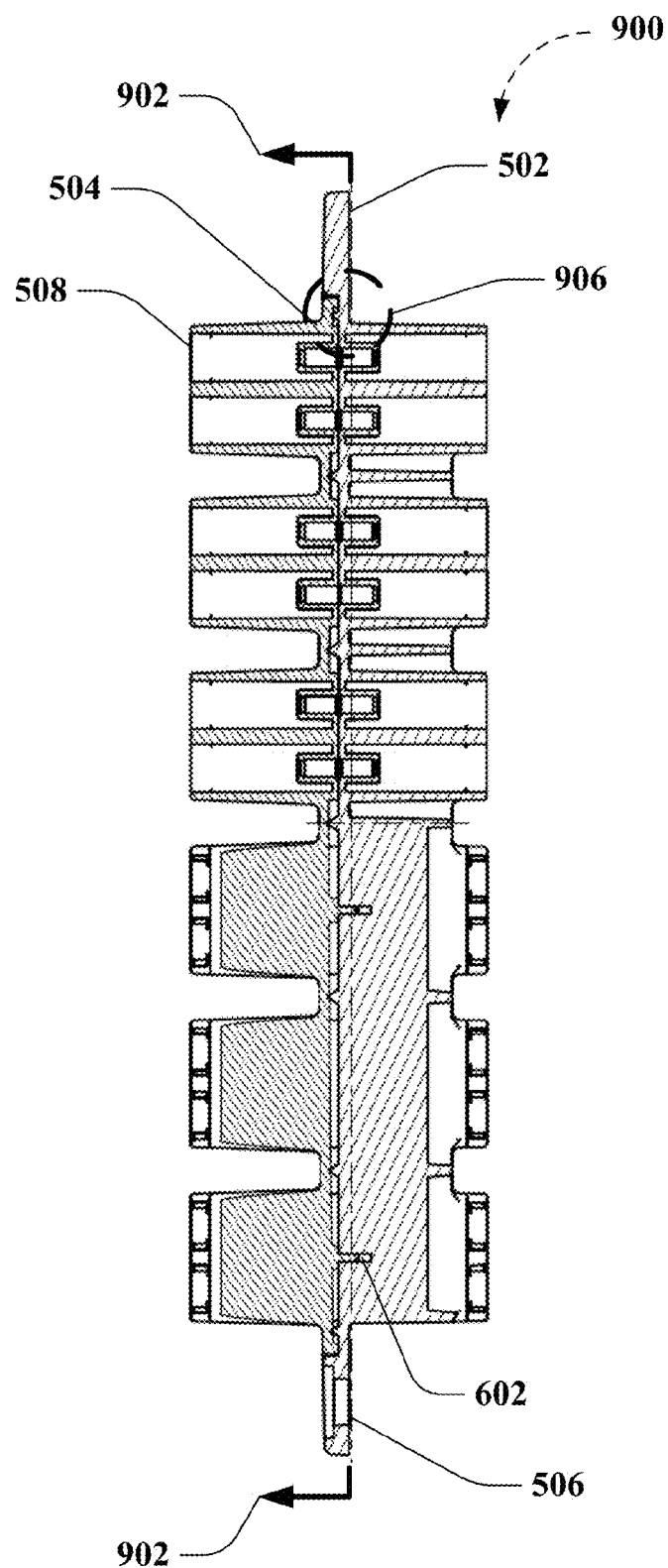
FIG. 9 depicts a cross-sectional view taken along section lines 802-802 of FIG. 8 for an exemplary non-limiting integrated LC fiber optic adapter plate assembly in which section lines indicate sectional details further detailed in FIG. 10.
Figure 10:
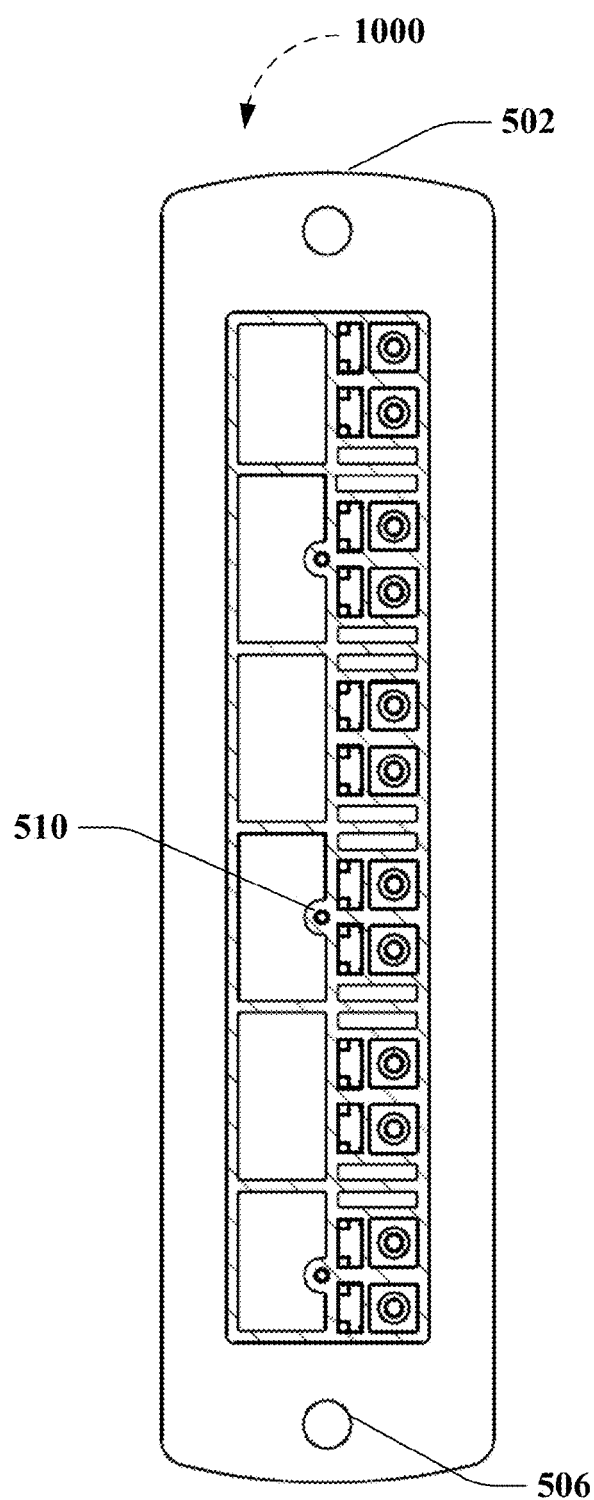
FIG. 10 depicts a cross-sectional view taken along section lines 902-902 of FIG. 9 for an exemplary non-limiting integrated LC fiber optic adapter plate assembly according to further aspects of the disclosed subject matter.

FIG. 9 depicts a cross-sectional view 900 taken along section lines 802-802 of FIG. 8 for an exemplary non-limiting integrated LC fiber optic adapter plate assembly 800, in which section lines 902-902 indicate sectional details further detailed in FIG. 10. Note that FIG. 9 depicts mating pins or studs 602 of front adapter plate 504 that mate with hole or recess 510 of back adapter plate 502 to facilitate alignment and assembly of plates 502 and 504 by factory personnel or machines to provide fiber optic adapter plate assemblies (e.g., 500, 600, 700, 800, 900, etc.) with integrated fiber optic adapters (e.g., combination comprising subassemblies 508 of back adapter plate 502 and front adapter plate 504). In further non-limiting embodiments, slots and tabs, pins and holes and similar structures can facilitate alignment and assembly of plates 502 and 504 by factory personnel or machines.

Note further that portions of fiber optic adapter plate assemblies (e.g., 500, 600, 700, 800, 900, etc.) include alignment and attachment mechanisms to facilitate alignment and assembly of fiber optic adapter plates. For example, back adapter plate 502 can include a female recessed region (e.g., a recessed mating portion indicated in FIG. 9 by dashed circle 906) capable of accepting a male complementary portion (e.g., raised mating portion) of the front adapter plate 504, which can provide alignment, lateral stability and structural rigidity when back adapter plate 502 and front adapter plate 504 are properly joined.

While, for purposes of illustration, the back adapter plate 502 is depicted as having a recess capable of accepting a male complementary portion of the front adapter plate 504, it can be appreciated the subject matter disclosed and claimed herein is not so limited. For example, the front adapter plate 504 can be fabricated having a recess (not shown) capable of accepting a male complementary portion of the back adapter plate 502 (not shown), within the scope of the described embodiments as described below with reference to FIGS. 19-20. Likewise, in such an instance, front adapter plate 504 can include removable attaching mechanisms 506 (e.g., screws, clips, latches, etc.) or holes (not shown) suitable for use in attaching the adapter plate assembly 500 to an enclosure or patch panel (not shown). Accordingly, while the terms "back" and "front" have been used to describe the back adapter plate 502 and front adapter plate 504, terms "first" and "second" are also used herein (e.g., as in first and second fiber optic adapter plates) to denote that certain features (e.g., alignment, attachment, and mounting mechanisms, etc.) of the disclosed subject matter can appear on either a back adapter plate 502 or a front adapter plate 504 as desired for a particular design.

FIG. 10 depicts a cross-sectional view 1000 taken along 902-902 of FIG. 9 for an exemplary non-limiting integrated LC fiber optic adapter plate assembly 800 according to further aspects of the disclosed subject matter. In FIG. 10, hole or recess 510 of back adapter plate 502 is depicted, which hole or recess 510 facilitates assembly of plates 502 and 504 as described.

As mentioned, variations of the disclosed embodiments are intended to be encompassed within the scope of the subject matter described herein. For instance, the various embodiments of the structures, devices and methodologies of the disclosed subject matter can include additional standardized (e.g., as described in a FOCIS document) or as yet undeveloped fiber optic connector and adapter 508 types or standards or any desirable combination.

In addition, it can be appreciated that in some instances, additional component pieces (not shown) can be required to join back adapter plate 502 and front adapter plate 504 to form a complete and functioning integrated fiber optic adapter plate assembly (e.g., 500, 600, 700, 800, 900, etc.) as described below (e.g., ferrules, fiber optic cable). Accordingly, such embodiments should not be limited by any of the other exemplary non-limiting embodiments as described herein. Rather the claims appended hereto should be afforded the full breadth and scope consistent with the subject matter as disclosed and described herein. Furthermore, another aspect of the disclosed subject matter provides color coded (e.g., yellow, orange, aqua, grey, blue, clear, etc.) front adapter plates 504, back adapter plates 502, none or both as desired or dictated by convention or standard.

Advantageously, the disclosed embodiments can accommodate such additional feature(s) while maintaining the above described advantages of superior mechanical strength, significant reduction of fiber optic adapter (e.g., combination of subassemblies 508 of back adapter plate 502 and front adapter plate 504) movement within the parent fiber optic adapter plate assembly (e.g., combination comprising back adapter plate 502 and front adapter plate 504), significant manufacturing build cost reduction and increased port marking visibility.

Figure 11:
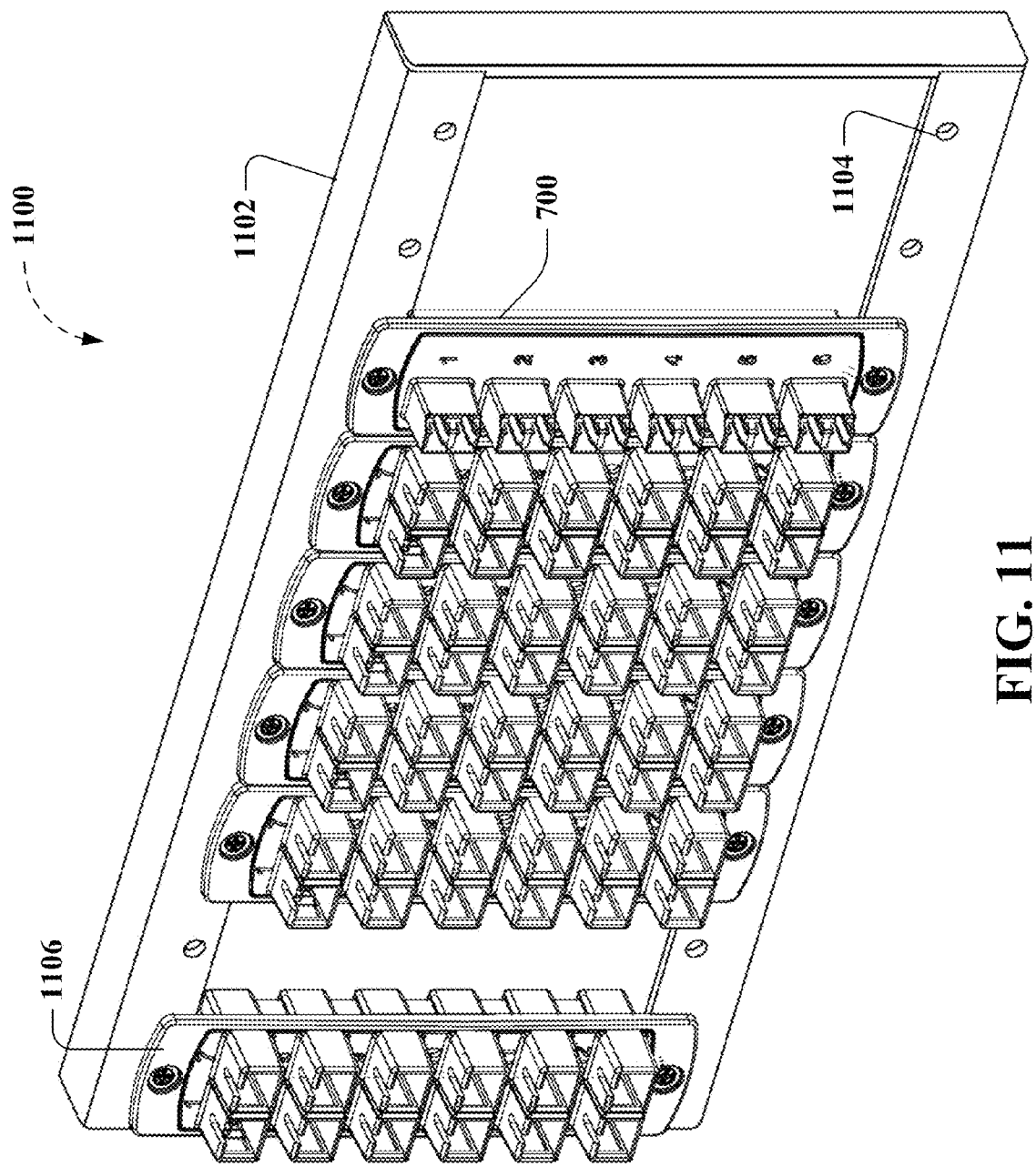
FIG. 11 depicts a diagram illustrating non-limiting aspects of exemplary adapter plate assembly installation, connection and configuration details.

Further Non-Limiting Embodiments of Fiber Optic Adapter Plates with Integrated Fiber Optic Adapters FIG. 11 depicts a diagram 1100 illustrating non-limiting aspects of exemplary installation, connection and/or configuration of an adapter plate assembly. For example, FIG. 11 illustrates an exemplary rack enclosure 1102 facilitating attachment and support of an array of integrated fiber optic adapter plate assemblies (e.g., 500, 600, 700, 800, 900, etc.) via an array of mounting holes 1104. For example, as previously described, integrated fiber optic adapter plate assembly 700 can include removable attaching mechanisms 506 (e.g., screws, clips, latches, etc.) or holes suitable for use in attaching the adapter plate assembly 500 to an enclosure 1102.

Whereas the removable attaching mechanisms 506 of integrated fiber optic adapter plate assembly 700 comprise a hole 506 and a screw attachable to enclosure 1102 in FIG. 11, it should be appreciated that such feature is a non-limiting detail. Further note that in addition to integrated fiber optic adapter plate assembly 700, FIG. 11 depicts an array of integrated SC fiber optic adapter plate assemblies 1106 attached to enclosure 1102. The integrated SC fiber optic adapter plate assemblies 1106 are described in more detail below.

Figure 12:
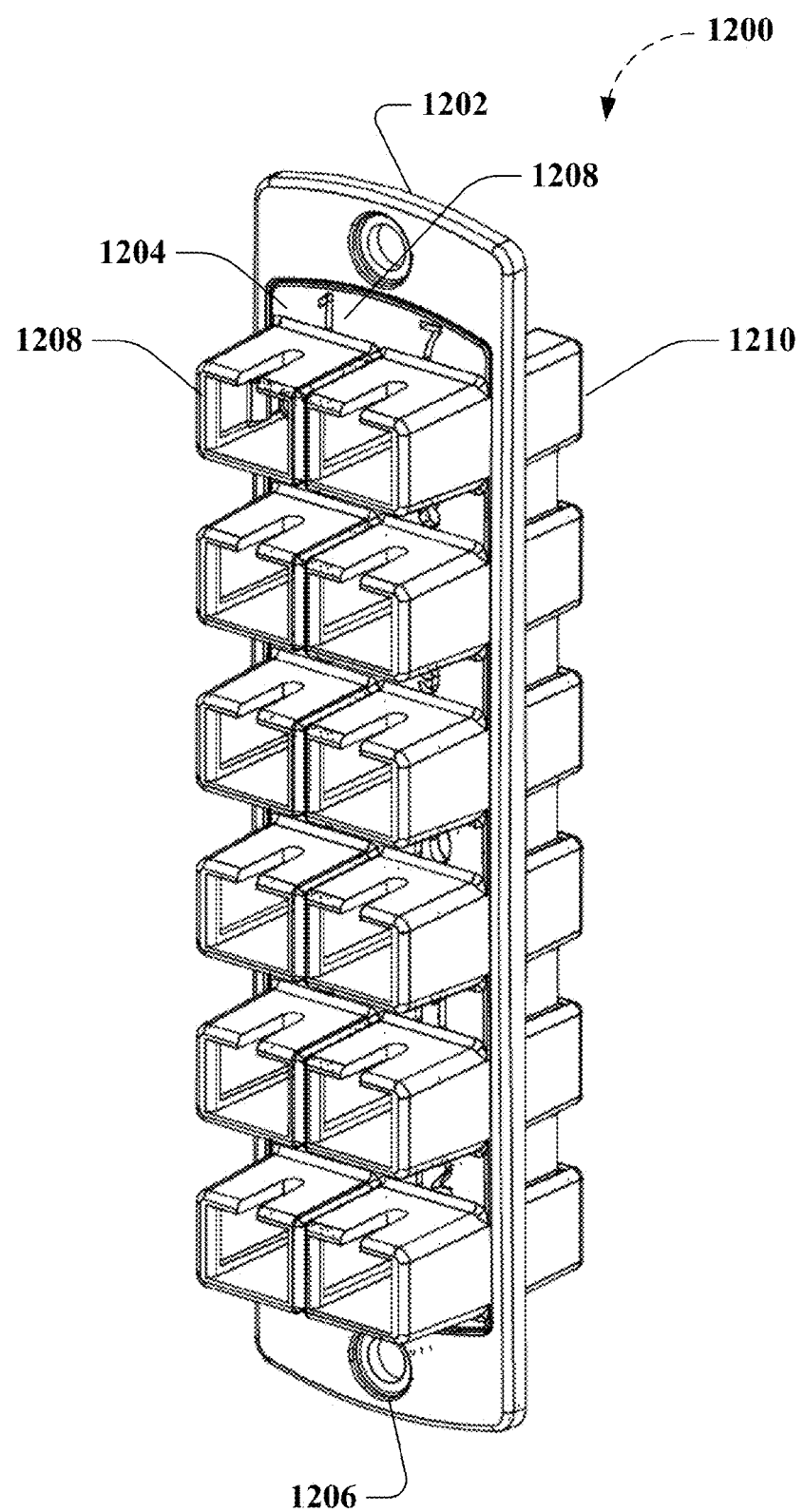
FIG. 12 illustrates an exemplary non-limiting embodiment of an integrated SC fiber optic adapter plate assembly according to aspects of the disclosed subject matter.

FIG. 12 illustrates an exemplary non-limiting embodiment of an integrated SC fiber optic adapter plate assembly 1200 according to aspects of the disclosed subject matter. As with FIG. 5, integrated SC fiber optic adapter plate assembly 1200 can comprise back adapter plate 1202 and front adapter plate 1204. Likewise, adapter plate assembly 1200 back adapter plate 1202 and front adapter plate 1204 can be fabricated (e.g., injection molded) of plastic (e.g., of a moldable plastic, polymer, etc.).

For purposes of illustration, the SC fiber optic adapter plate assembly 1200 is depicted as a 6-way duplex SC fiber optic adapter plate assembly. As mentioned above, it can be appreciated that other embodiments are possible (e.g., n-way simplex, n-way duplex, n-way with other adapters that are either specified by FOCIS or yet to be developed or standardized, where n is an integer, or any combination, and so on).

Adapter plate assembly 1200 back adapter plate 1202 can include removable attaching mechanisms 1206 (e.g., screws, clips, latches, etc.) or holes suitable for use in attaching the adapter plate assembly 1200 to an enclosure or patch panel (e.g., 1106, not shown in FIG. 12). FIG. 12 further depicts back adapter plate 1202 and front adapter plate 1204 comprising a plurality of integrated fiber optic cabling adapter subassemblies 1208 which in this non-limiting embodiment are depicted as integrated SC fiber optic cabling adapter subassemblies 1208. Note that fiber optic cabling adapter subassembly 1208 is depicted as portions of an adapter housing (e.g., SC fiber optic cabling adapter housing) integrated with front adapter plate 1204 which can be combined with a complementary portion such as a fiber optic cabling adapter subassembly 1208 that is integrated into back adapter plate 1202.

As mentioned, these integrated fiber optic cabling adapter subassemblies 1208 are described together using common reference characters. However, it can be appreciated that adapter subassemblies 1208 for back adapter plate 1202 and front adapter plate 1204 can have different physical dimensions and other characteristics depending on the design of the chosen adapter type and other factors. In other words, the use of the terminology "adapter subassemblies" is intended to convey that the two complementary adapter subassemblies 1208 on a back adapter plate 1202 and front adapter plate 1204, when combined in conjunction with other standard fiber optic cabling interface components, can create a functional standard fiber optic adapter that is integrated into the adapter plate assembly 1200 comprised of back adapter plate 1202 and front adapter plate 1204.

Note further that back adapter plate 1202 and front adapter plate 1204 can also include structures (e.g., similar to hole or recess 510 of back adapter plate 502, mating pins or studs not shown in FIG. 5 of front adapter plate 504, etc.) that facilitate alignment and assembly of plates 1202 and 1204 by factory personnel or machines to provide fiber optic adapter plate assemblies 1200 with integrated fiber optic adapters. As described above regarding FIG. 5, such mating pins or studs and associated holes or recesses 510, in conjunction with the recessed face of the back adapter plate 502 and mating surface on the front adapter plate 504, can aid in aligning the corresponding adapter subassemblies 508 as shown further in FIGS. 13-14 and 17. In further non-limiting embodiments, slots and tabs, pins and holes and similar structures can facilitate alignment and assembly of plates 1202 and 1204 by factory personnel or machines.

FIG. 12 illustrates a further aspect of an embodiment in which front adapter plate 1204 can further include molded port markings 1210 as part of the front adapter plate 1204 fabrication process. As described above, such molded port markings can provide a high contrast marking that can facilitate easy identification of port markings on the termination side of the fiber optic adapter plate assembly 1200 to aid installers and end users in correctly maintaining the network.

Figure 13:
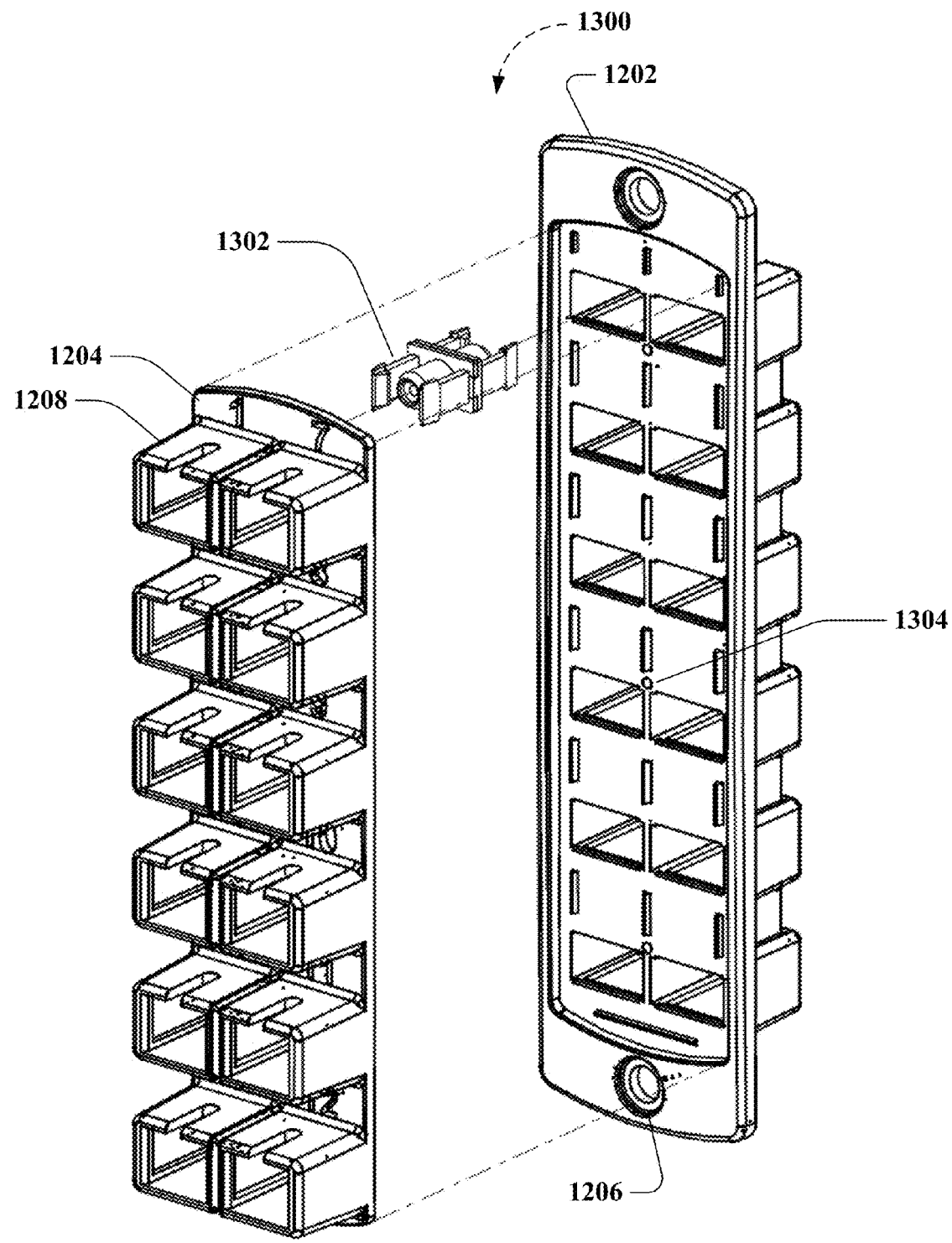
FIG. 13 depicts exemplary non-limiting embodiments of an integrated SC fiber optic adapter plate back adapter plate and front adapter plate in an exploded view according to further aspects of the disclosed subject matter.

FIG. 13 depicts exemplary non-limiting embodiments of an integrated SC fiber optic adapter plate assembly 1300 back adapter plate 1202 and front adapter plate 1204 in exploded view according to further aspects of the disclosed subject matter. Adapter plate assembly 1300 further details an attachment mechanism for attaching back adapter plate 1202 and front adapter plate 1204 to form fiber optic adapter plate assembly 1300. For example, note that front adapter plate 1204 can further include structures (e.g., mating pins or studs (not shown) of front adapter panel 1204, etc.) that mate with hole or recess 1304 of back adapter plate 1202 to facilitate assembly of plates 1202 and 1204 by factory personnel or machines to provide fiber optic adapter plate assemblies with integrated fiber optic adapters.

As described above in reference to FIG. 7, assembly 1200 can comprise back adapter plate 1202 and front adapter plate 1204 and can further include additional component pieces 1302 (e.g., TIA standard fiber optic cable interface pieces, etc.) to join or affix back adapter plate 1202 and front adapter plate 1204 to form a complete and functioning integrated fiber optic adapter plate assembly (e.g., 1200, 1300, etc.) as described below (e.g., ferrules or sleeves, fiber optic cable interface component pieces such as latches, etc.).

Figure 14:
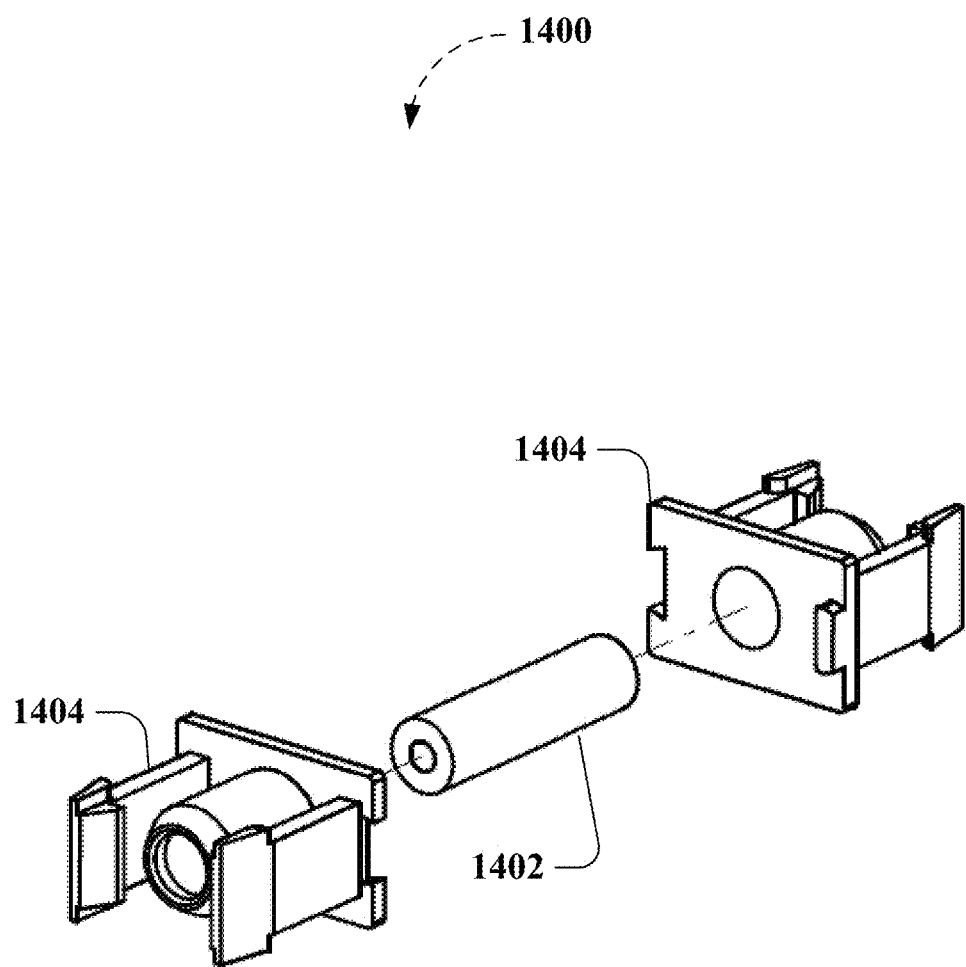
FIG. 14 is a pictorial view of an exemplary adapter ferrule or sleeve and housing or latch suitable for use in various embodiments of disclosed integrated fiber optic adapter plate assemblies.

For example, FIG. 14 is a pictorial view of exemplary TIA standard component pieces 1302 comprising adapter ferrule or sleeve 1402, which is typically comprised of phosphor-bronze or ceramic, for example, and housing or latch 1404 suitable for use in various embodiments of disclosed integrated fiber optic adapter plate assemblies (e.g., 1200, 1300, etc.). While, for purposes of illustration, the component pieces of 1302 are illustrated in FIG. 13 as a singular set for connecting one fiber optic cable to another, according to a further aspect, various aspects of the disclosed subject matter can utilize a connected array of latches 1404 (array not shown) suitable for forming a TIA standard interface in an array of adapters (e.g., assembly comprised of adapter subassemblies 1208 on back adapter plate 1202 and front adapter plate 1204). It should be appreciated that such a connected array of latches 1404 (array not shown) is made suitable by virtue of the improved tolerances afforded by the molded plastic array of adapter subassemblies 1208.

Figure 15:
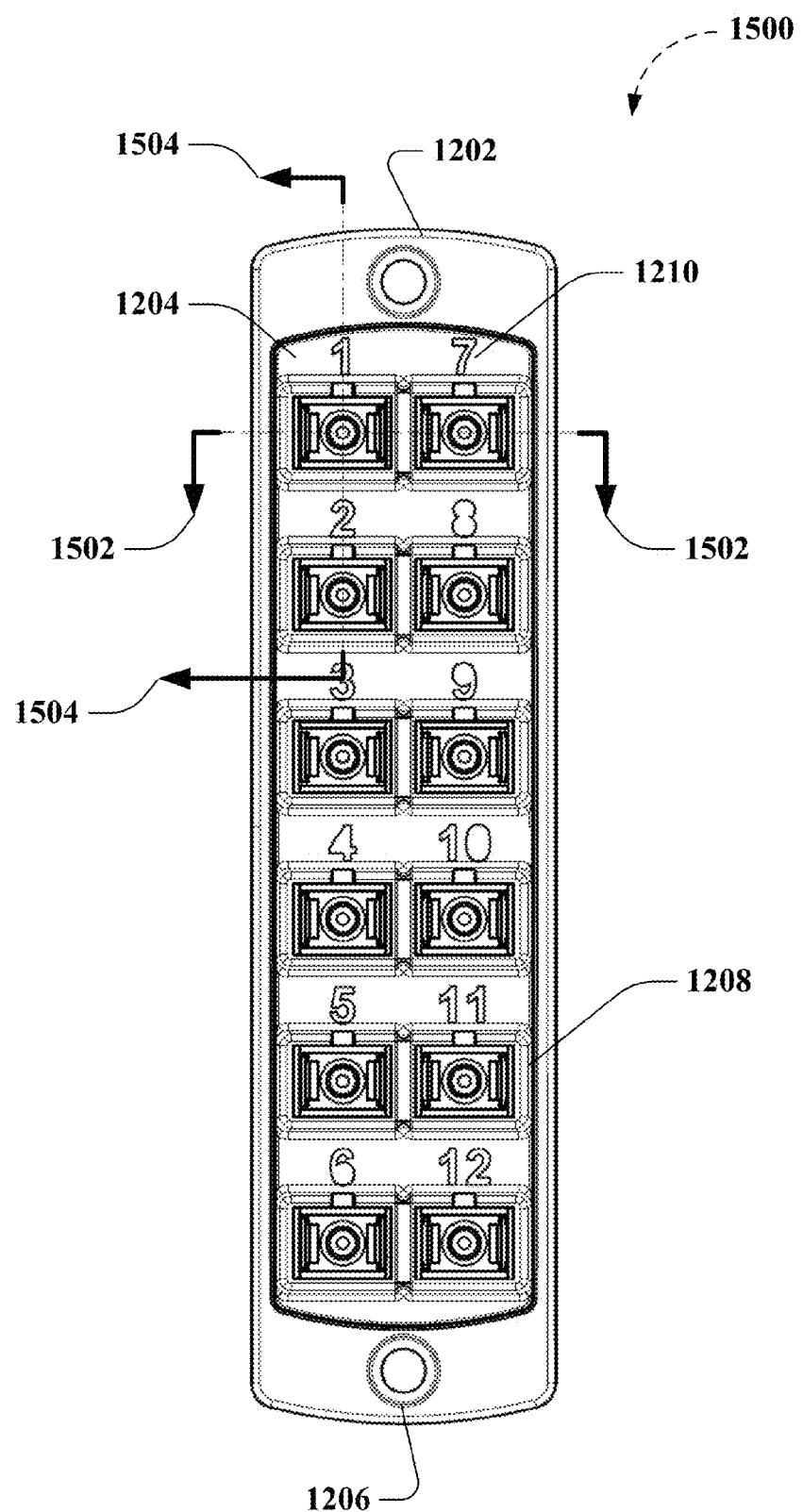
FIG. 15 depicts a front elevation view of an exemplary integrated SC fiber optic adapter plate assembly according to aspects of the disclosed subject matter in which section lines indicate sectional details further detailed in FIGS. 16 and 17.
Figure 16:
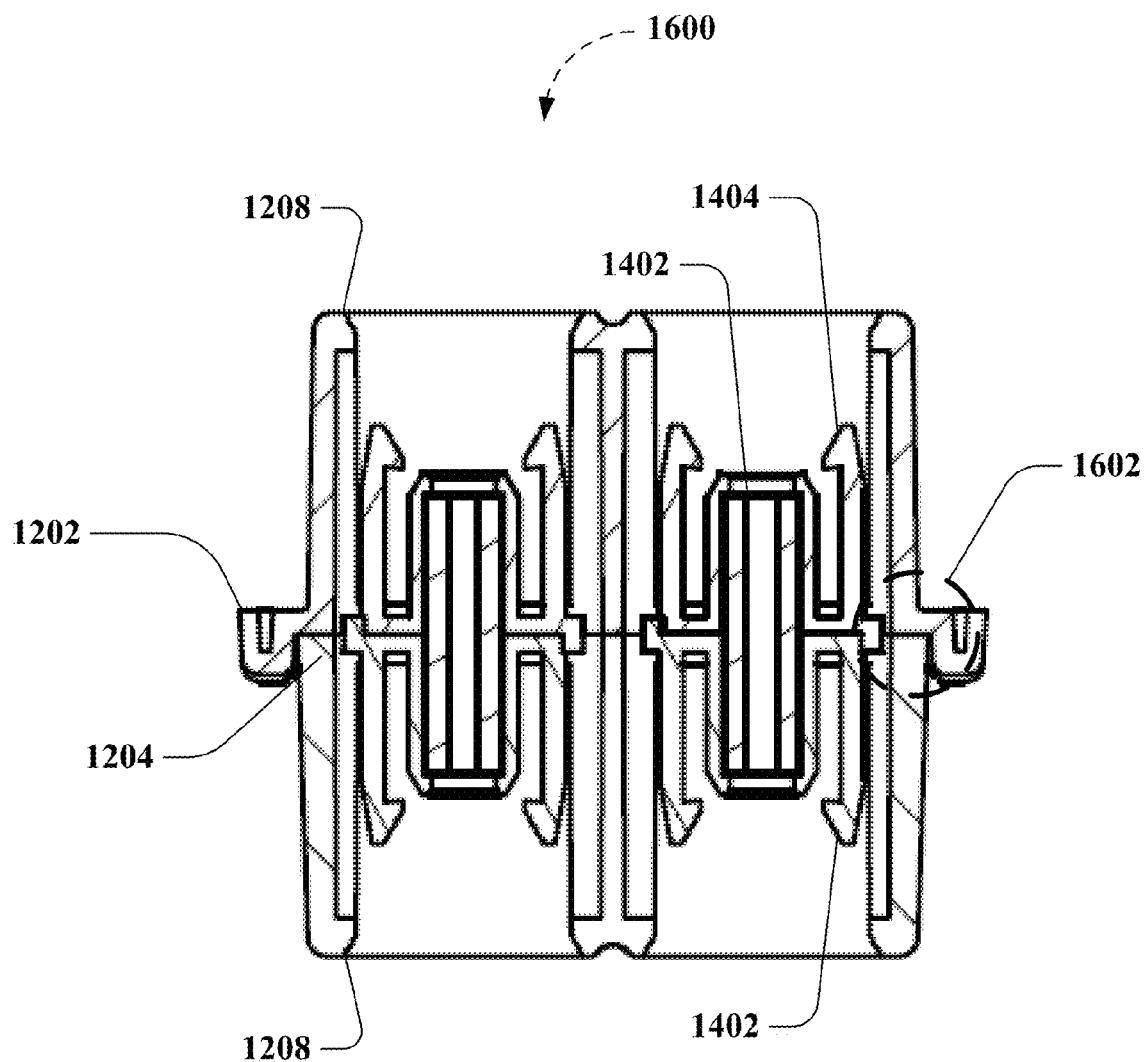
FIG. 16 depicts a cross-sectional view taken along section lines 1502-1502 of FIG. 15 for an exemplary non-limiting integrated SC fiber optic adapter plate assembly.
Figure 17:
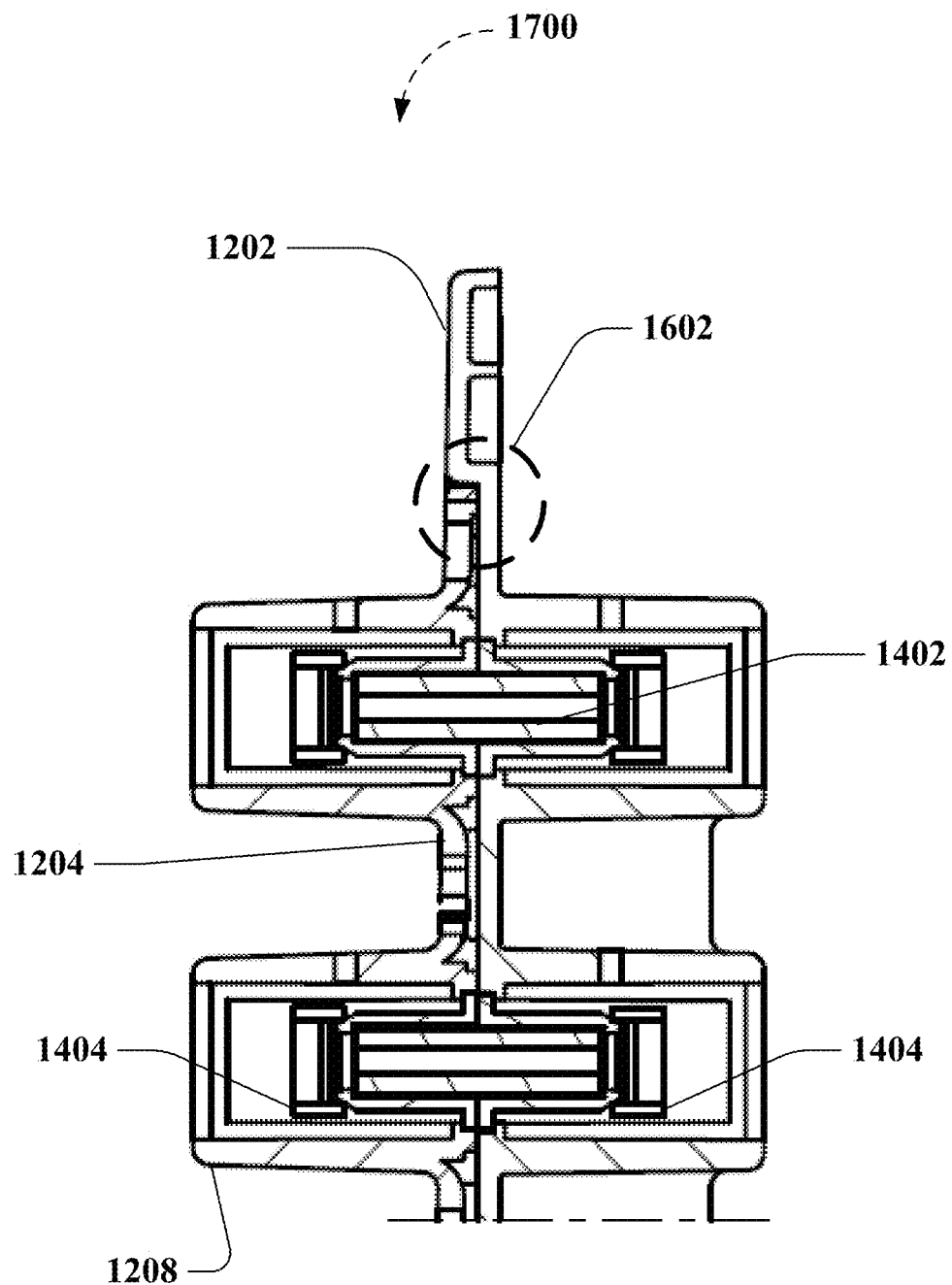
FIG. 17 depicts a cross-sectional view taken along 1504-1504 of FIG. 15 for an exemplary non-limiting integrated SC fiber optic adapter plate assembly according to further aspects of the disclosed subject matter.

FIG. 15 depicts a front elevation view of an exemplary integrated SC fiber optic adapter plate assembly 1500 according to aspects of the disclosed subject matter, in which section lines (e.g., 1502-1502 and 1504-1504) indicate sectional details further described in reference to FIGS. 16 and 17. For instance, FIG. 16 depicts a cross-sectional view 1600 taken along section lines 1502-1502 of FIG. 15 for an exemplary non-limiting integrated SC fiber optic adapter plate assembly 1500. FIG. 17 depicts a cross-sectional view 1700 taken along section lines 1504-1504 of FIG. 15 for an exemplary non-limiting integrated SC fiber optic adapter plate assembly 1500 according to further aspects of the disclosed subject matter.

FIGS. 16-17 further detail assembly 1500 structures where adapter ferrule or sleeve 1402 and housing or latch 1404 (e.g., component pieces 1302) are located within back adapter plate 1202 and front adapter plate 1204 during assembly of various embodiments of disclosed integrated fiber optic adapter plate assemblies (e.g., 1200, 1300, 1500, etc.) by factory personnel or machines. Note that portions of fiber optic adapter plate assemblies (e.g., 1200, 1300, 1500, etc.) include alignment and attachment mechanisms to facilitate alignment and assembly of fiber optic adapter plates. For example, back adapter plate 1202 can include a female recessed region (e.g., a recessed mating portion indicated in FIG. 16 by dashed circle 1602) capable of accepting a male complementary portion (e.g., raised mating portion) of the front adapter plate 1204, which provides alignment, lateral stability, and structural rigidity when back adapter plate 1202 and front adapter plate 1204 are joined or affixed. As described above regarding FIG. 7, various techniques can be used to join back adapter plate 1202 to front adapter plate 1204.

While, for purposes of illustration, the back adapter plate 1202 is depicted as having a recess capable of accepting a male complementary portion of the front adapter plate 1204, it can be appreciated that the subject matter is not so limited. Thus, it can be appreciated that front adapter plate 1204 can be fabricated having a recess (not shown) capable of accepting a male complementary portion of the back adapter plate 1202 (not shown), without departing from the scope of the described embodiments as described below with reference to FIG. 19-20. In such an instance, front adapter plate 1204 can further include removable attaching mechanisms 1206 (e.g., screws, clips, latches, etc.) or holes (not shown) suitable for use in attaching the adapter plate assembly (e.g., 1200, 1300, 1500, etc.) to an enclosure 1102 or patch panel.

As described above, while the terms "back" and "front" have been used to describe the back adapter plate 1202 and front adapter plate 1204, terms "first" and "second" are also used herein (e.g., as in first and second fiber optic adapter plates) to denote that certain features (e.g., alignment, attachment, and mounting mechanisms, etc.) of the disclosed subject matter can appear on either a back adapter plate 1202 or a front adapter plate 1204 as desired for a particular design. As further described above with reference to FIG. 5, another aspect of the disclosed subject matter provides color coded (e.g., yellow, orange, aqua, grey, blue, clear, etc.) front adapter plates 1204, back adapter plates 1202, none or both as desired or dictated by convention or standard as suitable for use in identifying the intended use of adapter plate assemblies (e.g., 1200, 1300, 1500, etc.).

Figure 18:
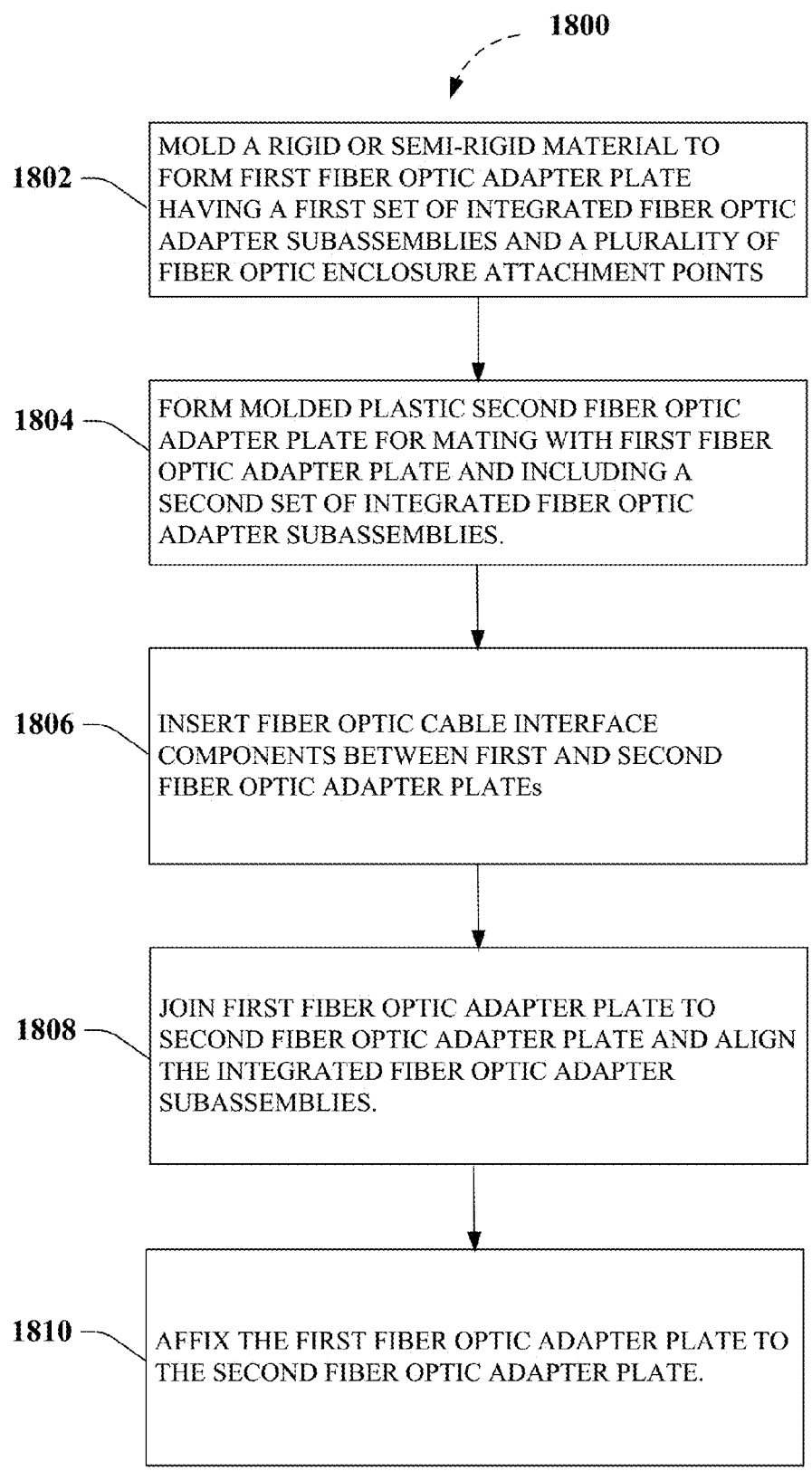
FIG. 18 depicts exemplary non-limiting methodologies for creating fiber optic adapter plates and assemblies with integrated fiber optic adapters in accordance with aspects of the disclosed subject matter.

In view of the structures and devices described supra, methodologies that can be implemented in accordance with the disclosed subject matter will be better appreciated with reference to the flowchart of FIG. 18. While, for purposes of simplicity of explanation, the methodologies are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methodologies described hereinafter.

Exemplary Methodologies

FIG. 18 depicts exemplary non-limiting methodologies for creating fiber optic adapter plates and assemblies (e.g., 500, 600, 700, 800, 900, 1000, 1200, 1300, 1500, 1900, 2000, etc.) with integrated fiber optic adapters in accordance with aspects of the disclosed subject matter. As can be appreciated, variations in the exemplary methodologies known to one having ordinary skill in the art may be possible without deviating from the intended scope of the subject matter as claimed.

For instance, at 1802, a first fiber optic adapter plate (e.g., 502/504, 1202/1204) can be formed from a rigid or semi-rigid material (e.g., moldable plastic, polymer, etc.) in a mold such that the first fiber optic adapter plate includes a first set of integrated fiber optic adapter subassemblies (e.g., 508/1208) and a plurality of fiber optic enclosure 1102 attachment points (e.g., 506/1206). In an aspect of the disclosed subject matter, various embodiments can be molded 1802 from a colored plastic based on an intended usage as described above and a color scheme, such as a standardized color scheme (e.g., ANSI/TIA/EIA-598-A-1995). In a further aspect, various non-limiting embodiments can incorporate labels molded into the first fiber optic adapter plate (e.g., 502/504, 1202/1204) as described above.

Likewise, at 1804, a second fiber optic adapter plate (e.g., 504/502, 1204/1202) can be formed from a rigid or semi-rigid material (e.g., moldable plastic, polymer, etc.). The second fiber optic adapter plate can be molded such that it mates to the first fiber optic adapter plate (e.g., 502/504, 1202/1204) and includes a second set of integrated fiber optic adapter subassemblies (e.g., 508/1208). As with the first fiber optic adapter plate, various embodiments can be formed 1804 from a colored plastic based on an intended usage as described above and a color scheme, such as a standardized color scheme (e.g., ANSI/TIA/EIA-598-A-1995), and can incorporate labels molded into the second fiber optic adapter plate (e.g., 504/502, 1204/1202) as described above.

In various non-limiting embodiments of the disclosed subject matter, the methodologies 1800 for producing a plastic fiber optic adapter plate can include inserting 1806 fiber optic cable interface components (e.g., TIA standard fiber optic cable interface components 1302 (1402/1404)) between the first fiber optic adapter plate (e.g., 502/504, 1202/1204) and the second fiber optic adapter plate (e.g., 504/502, 1204/1202).

At 1808, the first fiber optic adapter plate (e.g., 502/504, 1202/1204) can be joined to the second fiber optic adapter plate (e.g., 504/502, 1204/1202) so as to align the first set of integrated fiber optic adapter subassemblies (e.g., 508/1208) with the second set of integrated fiber optic adapter subassemblies (e.g., 508/1208). At 1810, the first fiber optic adapter plate (e.g., 502/504, 1202/1204) can be affixed to the second fiber optic adapter plate (e.g., 504/502, 1204/1202).

For example, as described above regarding FIG. 5, first fiber optic adapter plate (e.g., 502/504, 1202/1204) can be joined or affixed to the second fiber optic adapter plate (e.g., 504/502, 1204/1202) via plastic welding (e.g., RF welding, ultrasonic welding, HF welding, extrusion welding, contact welding, hot plate welding, solvent welding, etc.), a snap fit (e.g., mating pins or studs of one adapter plate mate and snap into a hole or recess 510 of another adapter plate), thermoplastic staking or heat staking (e.g., mating pins or studs 602 of one adapter plate mate with a hole or recess 510 of another adapter plate with heat applied to melt the mated surfaces together), application and curing of adhesives to the complementary mating surfaces of the first fiber optic adapter plate (e.g., 502/504, 1202/1204) to the second fiber optic adapter plate (e.g., 504/502, 1204/1202), mechanical connections (e.g., screws, latches, rivets, etc.), and so on.

Further non-limiting embodiments of methodologies 1800 (not shown) can include fitting removable attaching mechanisms 506/1206 (e.g., screws, clips, latches, etc.) or holes suitable for use in attaching the fiber optic adapter plates to an enclosure or patch.

Accordingly, in another embodiment, a method for producing a plastic fiber optic adapter plate includes molding a rigid or semi-rigid material including forming a first fiber optic adapter plate having a first set of integrated fiber optic adapter subassemblies and forming fiber optic enclosure attachment points on the first fiber optic adapter plate. The molding can include molding a colored plastic based on an intended usage and a color scheme (e.g., a standardized color scheme) and/or molding labels into the first fiber optic adapter plate.

The forming can include forming a molded plastic second fiber optic adapter plate for mating with the first fiber optic adapter plate and forming a second set of integrated fiber optic adapter subassemblies as part of the molded plastic second fiber optic adapter plate corresponding to the first set. The forming can include forming a colored plastic based on an intended usage and a color scheme (e.g., a standardized color scheme) and/or forming labels into the molded plastic second fiber optic adapter plate.

Various methodologies can further include joining the first fiber optic adapter plate and the molded plastic second fiber optic adapter plate including aligning the first set of integrated fiber optic adapter subassemblies with the second set of integrated fiber optic adapter subassemblies and affixing the first fiber optic adapter plate to the molded plastic second fiber optic adapter plate. The joining can further include inserting standardized fiber optic cable interface components between the first fiber optic adapter plate and the second fiber optic adapter plate. Additionally, the affixing can be any one or more of plastic welding, heat staking, adhesive bonding, and/or snap fitting.

Figure 19:
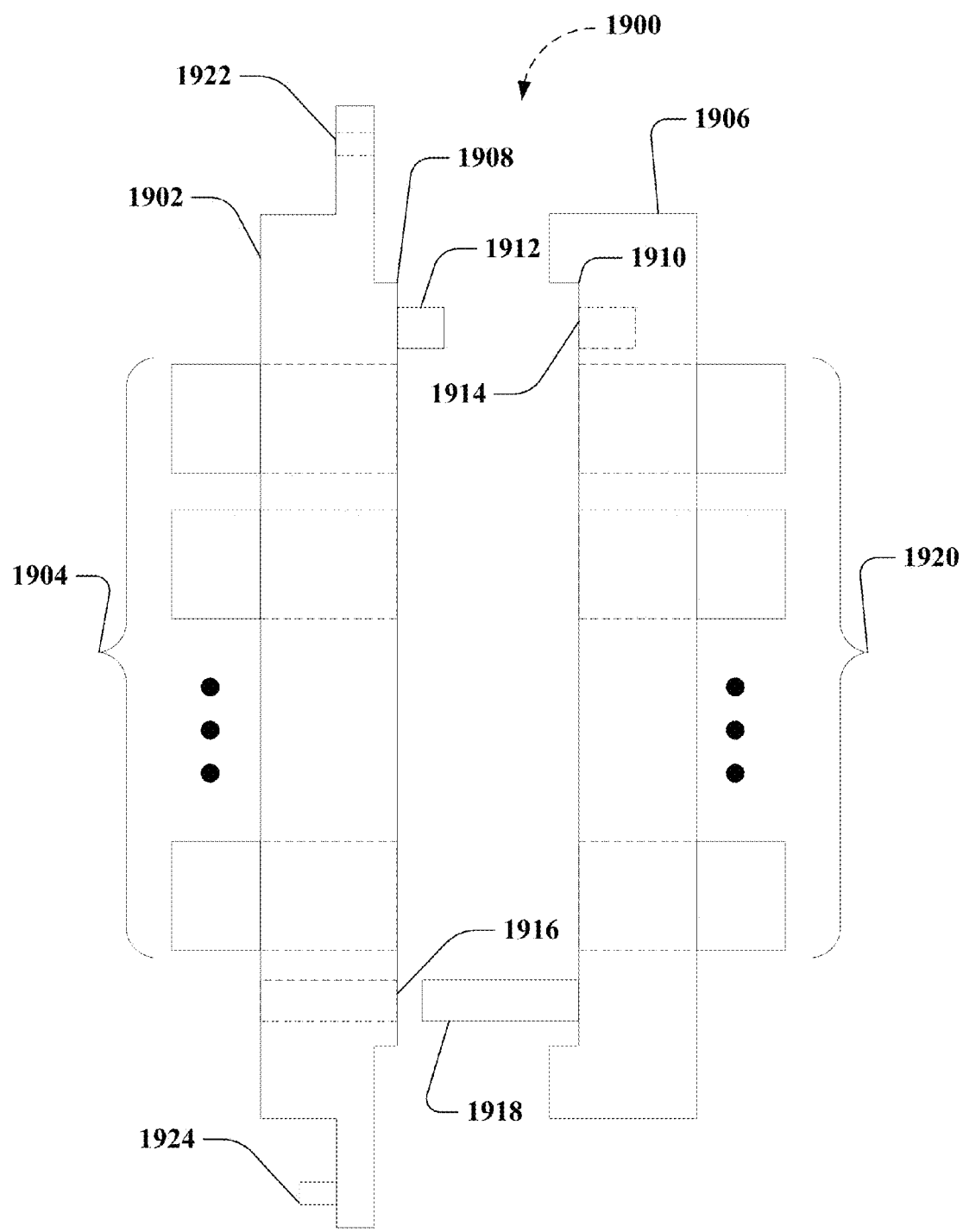
FIGS. 19-20 depict functional block diagrams illustrating further aspects of various non-limiting embodiments.
Figure 20:
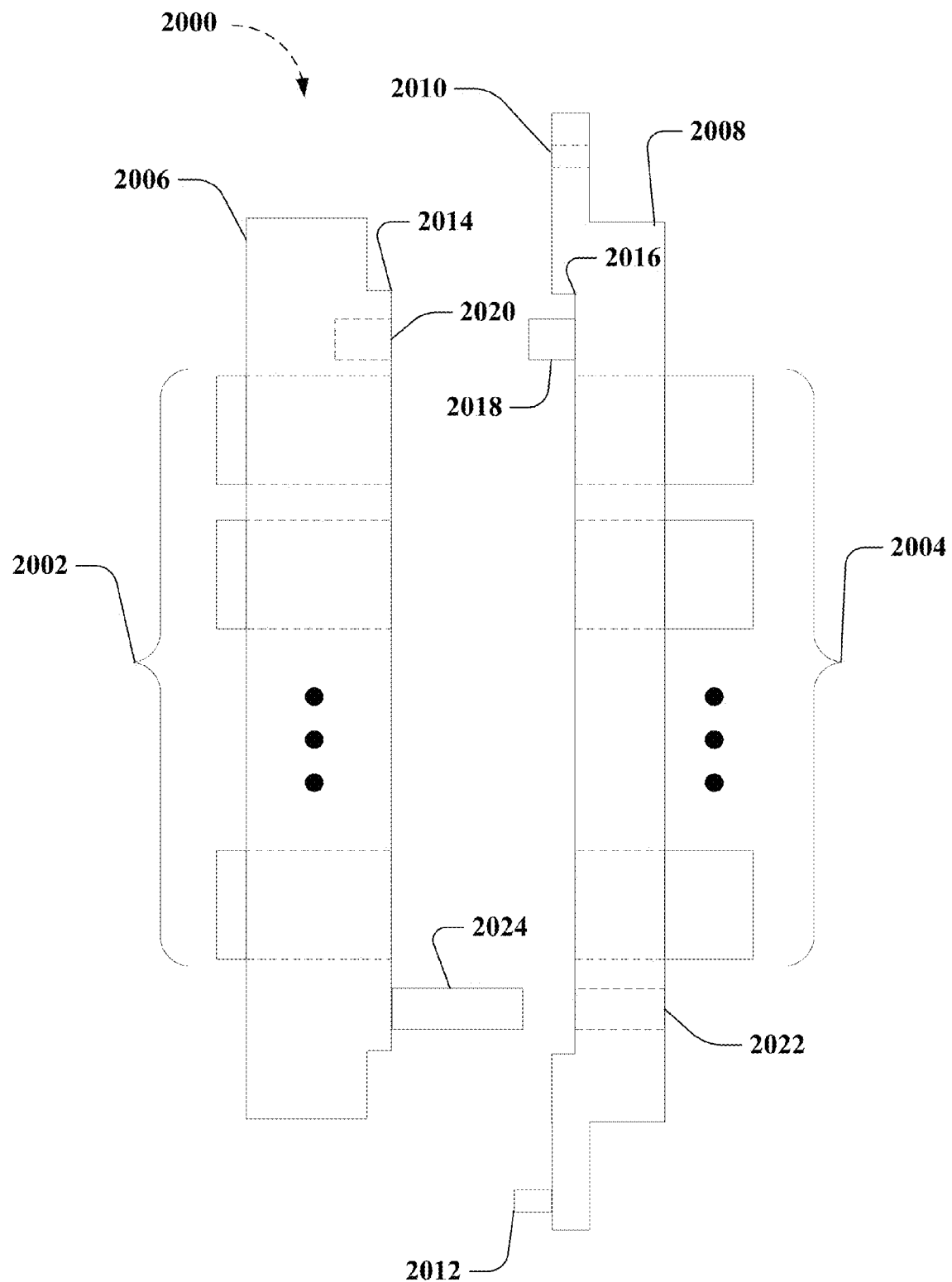

Exemplary Functional Block Diagrams of Fiber Optic Adapter Plates and Assemblies As an aid to understanding various aspects of the disclosed subject matter, FIGS. 19-20 depict functional block diagrams illustrating further non-limiting embodiments. For example, FIG. 19 illustrates a molded plastic fiber optic adapter plate assembly 1900 that includes an adapter back plate 1902 having a plurality of integrated fiber optic adapter subassemblies 1904. Adapter back plate 1902 can include an attachment mechanism that can align and attach an adapter front plate 1906. For example, the attachment mechanism can include shoulder 1908 working in conjunction with recess 1910, pin 1912 working in conjunction with hole 1914, through-hole 1916 working in conjunction with stud 1918, and so on, as well as combinations or other variations that facilitate attachment and alignment of adapter front plate 1906 to the adapter back plate 1902.

Adapter front plate 1906 of molded plastic fiber optic adapter plate assembly 1900 can include a plurality of integrated fiber optic adapter subassemblies 1920 that can correspond and align to the plurality (or a subset thereof) of integrated fiber optic adapter subassemblies 1904 during assembly of molded plastic fiber optic adapter plate assembly 1900. For example, the plurality of integrated fiber optic adapter subassemblies 1920 on adapter front plate 1906 can include fewer adapter subassemblies than the plurality of integrated fiber optic adapter subassemblies 1904 on the adapter back plate 1902 (not shown). This plurality of fiber optic adapter subassemblies 1920 can be arranged to match or correspond to a subset of integrated fiber optic adapter subassemblies 1904 as described below with regard to FIGS. 21-22, for example. As a further example, adapter front plate 1906, rather than including the same number of integrated fiber optic adapter subassemblies 1920 (e.g., such as in the adapter front plate 504 of 6-way duplex LC fiber optic adapter plate assembly 500), can include a number of n-way fiber optic adapter subassemblies 1920 that can be arranged to match a subset of integrated fiber optic adapter subassemblies 1904, where n is an integral number (e.g., two 3-way, three 2-way, six 1-way, four 1-way and one 2-way, etc., and any combination of fiber optic adapter subassemblies (not shown)).

Molded plastic fiber optic adapter plate assembly 1900 can further comprise an attachment mechanism that facilitates attaching the molded plastic fiber optic adapter plate assembly 1900 to an enclosure 1102. For instance, hole 1922 can accept a screw, latch, stud, bolt, rivet, or other fastening device to facilitate attaching the molded plastic fiber optic adapter plate assembly 1900 to an enclosure 1102. Likewise, a stud, pin, latch attached protrusion 1924 or other attached device can be used to attach the molded plastic fiber optic adapter plate assembly 1900 to an enclosure 1102.

Thus, as described above, one or more embodiments of a molded plastic fiber optic adapter plate include a molded plastic adapter back plate having integrated fiber optic adapter subassemblies. The adapter plate can include a first attachment mechanism adapted to align and attach an adapter front plate having corresponding integrated fiber optic adapter subassemblies and a second attachment mechanism adapted to attach the molded plastic fiber optic adapter plate to an enclosure.

With respect to other non-limiting aspects, the first attachment mechanism can (1) be a recessed portion of the molded plastic adapter back plate that accepts a raised mating portion of the adapter front plate; (2) include a raised portion of the molded plastic adapter back plate that inserts into a recessed mating portion of the adapter front plate; and/or (3) include mating surfaces on the molded plastic adapter back plate and the adapter front plate suitable for plastic welding, heat staking, adhesive bonding, and/or snap fitting. The second attachment mechanism can include holes on the molded plastic adapter back plate that align to corresponding portions of the enclosure and/or holes on the adapter front plate that align to corresponding portions of the enclosure.

Additionally, the adapter front plate can include labels molded into the adapter front plate. The adapter front plate can include colored plastic selected based on an intended usage of the plastic fiber optic adapter plate according to a color scheme (e.g., a standardized color scheme). Moreover, the molded plastic fiber optic adapter plate can also include standardized fiber optic cable interface component(s) located within the adapter front plate and the adapter back plate when the adapter front plate is attached to the adapter back plate via the first attachment mechanism.

As described above, variations of attachment and alignment mechanisms are possible as further described below. As an example, FIG. 20 depicts a fiber optic adapter plate assembly 2000 having an array of integrated fiber optic adapters (e.g., comprising arrays of integrated fiber optic adapter subassemblies 2002 and 2004). For instance, a fiber optic adapter plate assembly 2000 can include an adapter back plate 2006 having an array of integrated fiber optic adapter subassemblies 2002 and an adapter front plate 2008 having a corresponding second array of integrated fiber optic adapter subassemblies 2004 arranged to match the first array 2002. It is noted that the corresponding second array 2004 can include fewer integrated fiber optic adapter subassemblies than array 2002 as described above and as described below with regard to FIGS. 21-22. As an example, adapter front plate 2008, rather than including (in array 2004) the same number of integrated fiber optic adapter subassemblies as in array 2002 (e.g., such as in the adapter front plate 504 of 6-way duplex LC fiber optic adapter plate assembly 500), can include a number of n-way fiber optic adapter subassemblies in array 2004 that can be arranged to match a subset of the subassemblies in array 2002, where n is an integral number (e.g., two 3-way, three 2-way, one to six 1-way, four 1-way and one 2-way, etc., and any combination of fiber optic adapter subassemblies (not shown)).

Fiber optic adapter plate assembly 2000 can further comprise a mount point for mounting the fiber optic adapter plate assembly 2000 to a fiber optic rack 1102. As non-limiting examples, hole 2010 of adapter front plate 2008 can accept a screw, latch, stud, bolt, rivet, or other fastening device to facilitate mounting the fiber optic adapter plate assembly 2000 to an enclosure 1102. Likewise, a stud, pin, latch, attached protrusion 2012 or other attached device can be used to mount the fiber optic adapter plate assembly 2000 to an enclosure 1102.

In other aspects, the adapter back plate 2006 and the adapter front plate 2008 can include a mating shoulder 2014 and corresponding recess 2016 that facilitates alignment and positioning of the adapter front plate 2008 and associated array of integrated fiber optic adapter subassemblies 2004 relative to the adapter back plate 2006 and its array of integrated fiber optic adapter subassemblies 2002. Other alignment and attachment mechanisms are possible as previously described. For example, an alignment and attachment mechanism can include pin 2018 working in conjunction with hole 2020, through-hole 2022 working in conjunction with 2024, and so on, as well as combinations or other variations that facilitate attachment and alignment of adapter front plate 2008 to the adapter back plate 2006.

Accordingly, in another non-limiting embodiment, a fiber optic adapter plate includes an adapter back plate having a first array of integrated fiber optic adapter subassemblies, an adapter front plate having a second array of integrated fiber optic adapter subassemblies arranged to match the first array, and a mount point for mounting the fiber optic adapter plate to a fiber optic rack. The adapter back plate and the adapter front plate may include a mating shoulder and corresponding recess that positions the adapter front plate relative to the adapter back plate to align the first and second arrays. The adapter back plate and the adapter front plate may be comprised of any of a set of moldable plastics configurable, or adapted when molded, to join the adapter back plate and the adapter front plate via any one or more of plastic welding, heat staking, adhesive bonding, and/or snap fitting.

Figure 21:
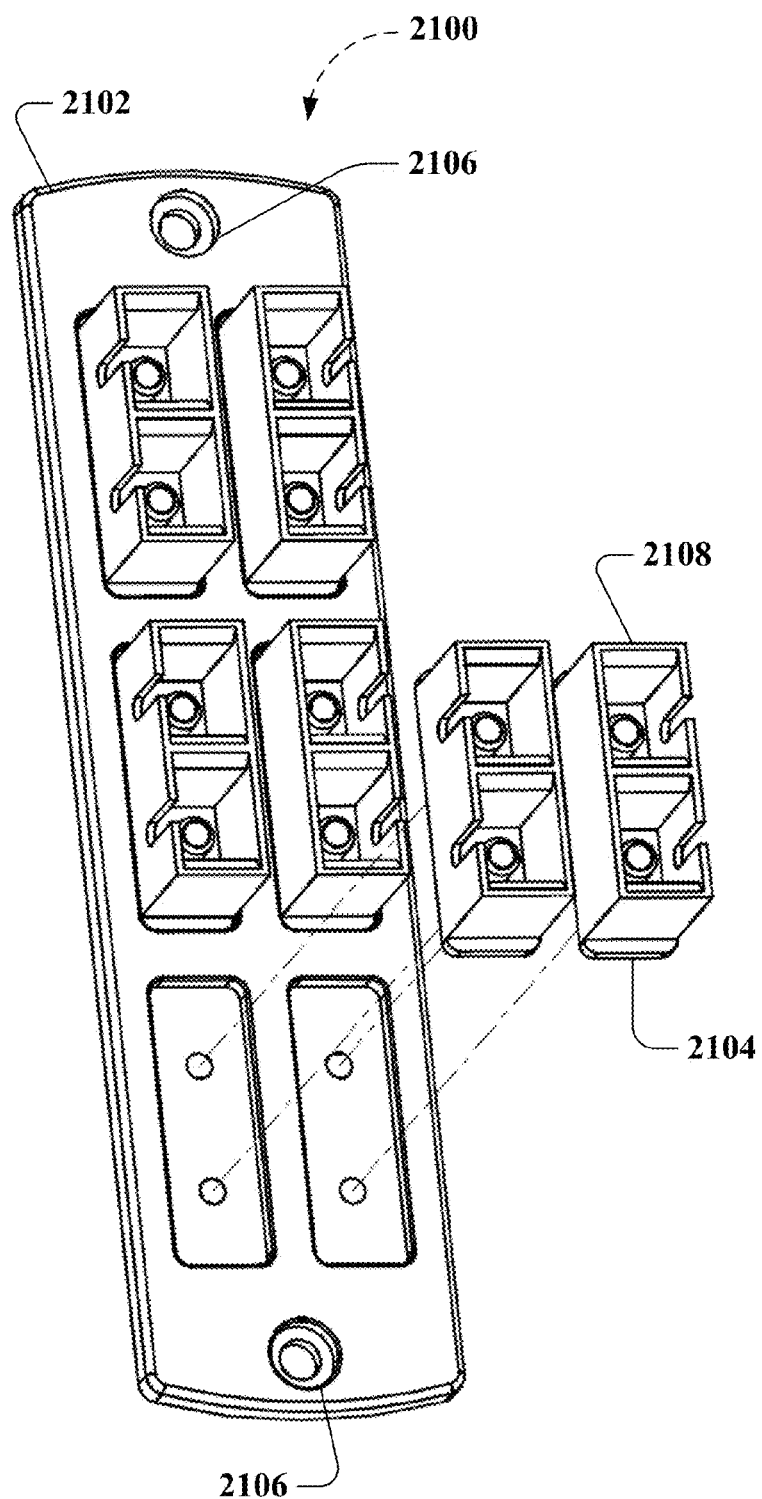
FIGS. 21-22 depict exemplary non-limiting embodiments of integrated SC fiber optic adapter plate assemblies back adapter plates and front adapter plates in an exploded view according to further aspects of the disclosed subject matter
Figure 22:
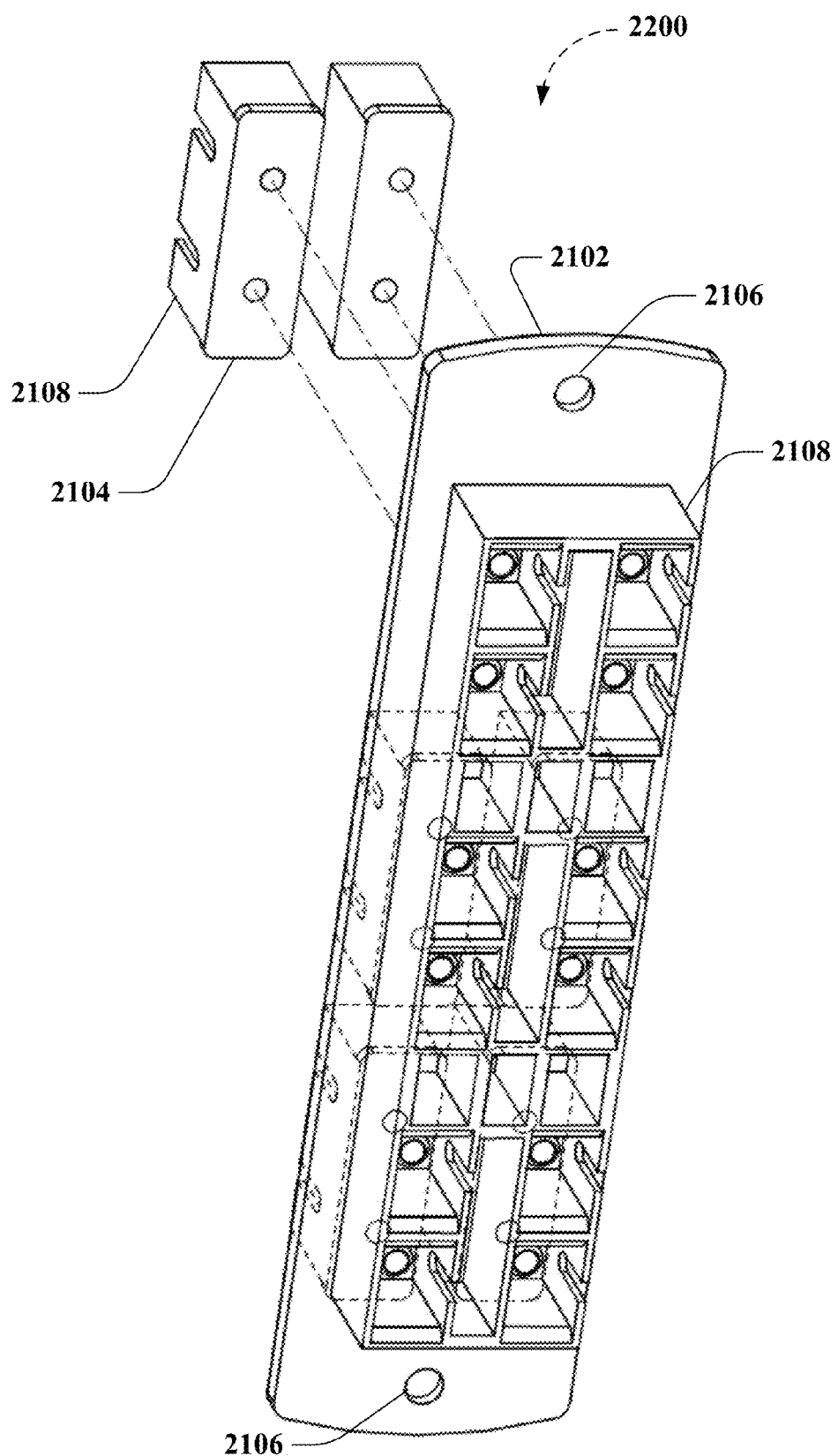

FIGS. 21-22 further depict exemplary non-limiting embodiments of integrated SC fiber optic adapter plate assemblies 2100 and 2200 back adapter plates 2102 and front adapter plates 2104 in an exploded view according to further aspects of the disclosed subject matter. For example, FIG. 21 depicts a front-side view of exemplary non-limiting embodiments of an integrated SC fiber optic adapter plate assembly 2100 back adapter plate 2102 and front adapter plates 2104, whereas FIG. 22 depicts a back-side view of exemplary non-limiting embodiments of an integrated SC fiber optic adapter plate assembly 2200 back adapter plate 2102 and front adapter plates 2104.

Adapter plate assemblies 2100 and 2200 back adapter plate 2102 can further include removable attaching mechanisms 2106 (e.g., screws, clips, latches, etc.) or holes suitable for use in attaching the adapter plate assemblies 2100 and 2200 to an enclosure or patch panel (not shown). As described above regarding FIGS. 19-20, it can be seen that front adapter plates 2104 can include fewer integrated fiber optic adapter subassemblies 2108 than back adapter plate 2102. For example, in FIGS. 21-22, adapter plate assemblies 2100 and 2200 can include an array of six front adapter plates 2104 each of which can, in turn, include a 1-way duplex integrated fiber optic adapter subassembly 2108, whereas back adapter plate 2102 can include an N-way array, e.g., a 6-way array, of duplex integrated fiber optic adapter subassemblies 2108.

Thus, in the exemplary embodiments depicted in FIGS. 21-22, front adapter plates 2104 can comprise an array of integrated fiber optic adapter subassemblies 2108 (e.g., an array of one or more) adapted to be attached or affixed to back adapter plate 2102. It can be appreciated that other embodiments are possible as described above regarding FIGS. 19-20, for example. As such, the disclosed subject matter should not be limited by any particular embodiment disclosed herein, and should be afforded the breadth and scope as can be appreciated by one of ordinary skill in the optical fiber art.

While the disclosed subject matter has been described in connection with the preferred embodiments of the various figures, it is to be understood that other similar embodiments may be used with, or modifications and additions may be made to, the described embodiments for performing the same function of the disclosed subject matter without deviating therefrom. For example, one skilled in the art will recognize that aspects of the disclosed subject matter as described in the various embodiments of the present application may apply to other FOCIS connectors and adapters.

As a further example, variations of process parameters (e.g., dimensions, configurations, adapter arrangements, joining or affixing mechanisms, process step order, etc.) may be made to further optimize the provided structures, devices and methodologies, as shown and described herein. In any event, the structures and devices, as well as the associated methodologies, described herein have many applications in fiber optic connector design and manufacturing. Therefore, the disclosed subject matter should not be limited to any single embodiment described herein, but rather should be construed in breadth and scope in accordance with the appended claims.

What is claimed is:

1. A molded plastic fiber optic adapter plate assembly, comprising:
   a first adapter plate comprising a plurality of integrated fiber optic adapter subassemblies aligned and formed on a planar face of the first adapter plate, wherein the first adapter plate is a molded plastic adapter plate; and
   a second adapter plate comprising a plurality of attachment structures and a corresponding plurality of integrated fiber optic adapter subassemblies aligned and formed on a flat surface of the second adapter plate, wherein an integrated fiber optic adapter subassembly from the plurality of integrated fiber optic adapter subassemblies and the corresponding plurality of integrated fiber optic adapter subassemblies is configured to accept a pair of fiber optic cables, and wherein the first adapter plate comprises:
   a first attachment mechanism on another planar face of the first adapter plate adapted to align and attach the second adapter plate, wherein the first adapter plate is larger than the second adapter plate and the second adapter plate is configured to fit within a recessed portion of the first adapter plate via the first attachment mechanism; and
   a second attachment mechanism adapted to attach the first adapter plate to an enclosure.

2. The molded plastic fiber optic adapter plate assembly of claim 1, wherein the recessed portion of the first adapter plate accepts a raised mating face of the second adapter plate.

3. The molded plastic fiber optic adapter plate assembly of claim 1, wherein the second attachment mechanism comprises holes on the first adapter plate that align to corresponding portions of the enclosure.

4. The molded plastic fiber optic adapter plate assembly of claim 1, wherein the first attachment mechanism comprises mating surfaces on the first adapter plate and the second adapter plate suitable for at least one of plastic welding, heat staking, adhesive bonding, or snap fitting.

5. The molded plastic fiber optic adapter plate assembly of claim 1, wherein the second adapter plate further comprises one or more molded markings.

6. The molded plastic fiber optic adapter plate assembly of claim 1, wherein the second attachment mechanism comprises holes on the first adapter plate that align to corresponding portions of the enclosure.

7. The molded plastic fiber optic adapter plate assembly of claim 1, wherein the second adapter plate further comprises labels molded into the second adapter plate.

8. The molded plastic fiber optic adapter plate assembly of claim 1, wherein the second adapter plate comprises colored plastic selected based on an intended usage of the first fiber optic adapter plate assembly according to a color scheme.

9. The molded plastic fiber optic adapter plate assembly of claim 1, further comprising:
at least one fiber optic cable interface component located within the second adapter plate and the first adapter plate when the second adapter plate is attached to the first adapter plate via the first attachment mechanism.

10. A molded fiber optic adapter plate, comprising:
a first adapter plate comprising a first plurality of integrated fiber optic adapter subassemblies aligned and formed on a flat mating face of the first adapter plate;
an alignment mechanism on the flat mating face of the first adapter plate adapted to align and attach to a second adapter plate comprising a second plurality of integrated fiber optic adapter subassemblies aligned and formed on a flat surface the second adapter plate, wherein the first adapter plate is larger than the second adapter plate and a raised portion of the second adapter plate is configured to be affixed within a recessed portion of the first adapter plate via the alignment mechanism, and wherein the alignment mechanism further aligns the first plurality of integrated fiber optic adapter subassemblies with the second plurality of integrated fiber optic adapter subassemblies; and
an attachment mechanism adapted to attach the molded fiber optic adapter plate to an enclosure.

11. The molded fiber optic adapter plate of claim 10, wherein the alignment mechanism comprises a recessed portion of the first adapter plate that accepts a raised mating pin of the second adapter plate.

12. The molded fiber optic adapter plate of claim 10, further comprising the second adapter plate.

13. The molded fiber optic adapter plate of claim 12, wherein the alignment mechanism comprises a raised pin of the second adapter plate that inserts into a recessed mating portion of the first adapter plate.

14. A molded fiber optic apparatus, comprising:
first molded means for forming and retaining a first number of integrated fiber optic adapter subassemblies;
means for aligning the first number of integrated fiber optic adapter subassemblies with a second number of integrated fiber optic adapter subassemblies formed and retained by a second molded means, comprising means for fitting an adapter plate of the second molded means within a recessed portion of another adapter plate of the first molded means, wherein the second number corresponds to the first number, wherein an integrated fiber optic adapter subassembly from the first number of integrated fiber optic adapter subassemblies and the second number of integrated fiber optic adapter subassemblies is configured to accept a pair of fiber optic cables, wherein the other adapter plate of the first molded means is larger than the adapter plate of the second molded means, and wherein the first molded means is of a dissimilar configuration than a configuration of the second molded means; and
means for attaching the first molded means to an enclosure.

15. The molded fiber optic apparatus of claim 14, wherein the molded fiber optic apparatus comprises labeling means of the first molded means or the second molded means.

16. An integrated fiber optic adapter, comprising:
a first adapter plate comprising a set of fiber optic adapter subassemblies formed and arranged on a flat mating face of the first adapter plate;
a second adapter plate comprising a corresponding set of fiber optic adapter subassemblies formed and arranged on a flat surface the second adapter plate; and
an attachment element on the flat mating face of the first adapter plate adapted to align and attach the second adapter plate, wherein the first adapter plate is larger than the second adapter plate, wherein a mating shoulder of the second adapter plate is configured to be inserted within a recessed portion of the first adapter plate via the alignment element, and wherein a fiber optic adapter subassembly from the set of fiber optic adapter subassemblies and the corresponding set of fiber optic adapter subassemblies is configured to accept a pair of fiber optic cables.

17. The molded plastic fiber optic adapter plate assembly of claim 1, wherein the plurality of integrated fiber optic adapter subassemblies and the corresponding plurality of integrated fiber optic adapter subassemblies comprise a corresponding number of fiber optic adapter subassemblies.

18. The integrated fiber optic adapter of claim 16, wherein the attachment element is positioned to encircle at least a subset of the set of fiber optic adapter subassemblies.

19. The integrated fiber optic adapter of claim 16, further comprising:
at least one label molded into at least one of the first adapter plate or the second adapter plate.

20. The integrated fiber optic adapter of claim 16, wherein the set of fiber optic adapter subassemblies comprises a first number of fiber optic adapter subassemblies that correspond to a second number of fiber optic adapter subassemblies of the corresponding set of fiber optic adapter subassemblies.

21. A fiber optic adapter, comprising:
a first adapter subassembly comprising molded plastic and a first plurality of fiber optic adapter subassemblies;
a second adapter subassembly comprising a corresponding second plurality of fiber optic adapter subassemblies formed on a flat surface of the second adapter assembly; and
an alignment element adapted to align the first plurality of fiber optic adapter subassemblies with the corresponding second plurality of fiber optic adapter subassemblies, wherein the alignment element is located proximate to at least a first planar mating face of the first adapter subassembly or a second planar mating face of the second adapter subassembly, wherein the first adapter subassembly is larger than the second adapter subassembly, and wherein the flat surface of the second adapter subassembly is configured to fit within a recessed portion of the first adapter subassembly.

22. The fiber optic adapter of claim 21, further comprising:
at least one label molded into the first adapter subassembly or the second adapter subassembly.

23. The fiber optic adapter of claim 21, wherein the alignment element comprises the recessed portion and a mating shoulder of the second adapter subassembly.

24. The fiber optic adapter of claim 21, wherein the alignment element encompasses at least a subset of the first plurality of fiber optic adapter subassemblies or the corresponding second plurality of fiber optic adapter subassemblies.

25. The fiber optic adapter of claim 21, wherein the first plurality of fiber optic adapter subassemblies comprises an equal number of fiber optic adapter subassemblies with respect to the second plurality of fiber optic adapter subassemblies.

\* \* \* \* \*